(12) United States Patent
Zhang et al.

(10) Patent No.: US 12,490,414 B2
(45) Date of Patent: Dec. 2, 2025

(54) METHOD AND SYSTEM FOR CONTROLLING INTERNAL TEMPERATURE OF SERVER, SERVER, DEVICE, AND MEDIUM

(71) Applicant: SUZHOU METABRAIN INTELLIGENT TECHNOLOGY CO., LTD., Jiangsu (CN)

(72) Inventors: Xuehong Zhang, Jiangsu (CN); Cai Kong, Jiangsu (CN); Xianli Meng, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/115,742

(22) PCT Filed: Dec. 25, 2023

(86) PCT No.: PCT/CN2023/141601
§ 371 (c)(1),
(2) Date: Mar. 26, 2025

(87) PCT Pub. No.: WO2024/234661
PCT Pub. Date: Nov. 21, 2024

(65) Prior Publication Data
US 2025/0261345 A1    Aug. 14, 2025

(30) Foreign Application Priority Data
May 18, 2023   (CN) .......................... 202310561352.3

(51) Int. Cl.
*H05K 7/20*        (2006.01)
(52) U.S. Cl.
CPC ..... *H05K 7/20836* (2013.01); *H05K 7/20772* (2013.01)

(58) Field of Classification Search
CPC ............ G06F 1/206; G06F 1/20; G06F 1/181; H05K 7/20727; H05K 7/20209;
(Continued)

(56) References Cited

U.S. PATENT DOCUMENTS

| | | | |
|---|---|---|---|
| 6,283,380 B1 * | 9/2001 | Nakanishi | G05D 23/1917 454/258 |
| 6,398,505 B1 * | 6/2002 | Sekiguchi | F04D 25/166 417/2 |

(Continued)

FOREIGN PATENT DOCUMENTS

| | | |
|---|---|---|
| CN | 111949101 A | 11/2020 |
| CN | 113900503 A | 1/2022 |

(Continued)

*Primary Examiner* — Darrin D Dunn
(74) *Attorney, Agent, or Firm* — IPro, PLLC

(57) ABSTRACT

A method and system for controlling internal temperature of a server, a device, a non-transitory readable storage medium, and a server, which relate to the technical field of servers. The method is applied to a system for controlling the internal temperature of the server, and the method includes: acquiring, by the controller, element temperature of the heating elements in the heating element group; acquiring, by the controller and the fluid temperature sensor, the fluid temperature of the fluid between the heating elements in the heating element group; determining, by the controller, a motor speed of a motor corresponding to the heating element group according to the element temperature and the fluid temperature; and controlling, by the controller, the motor speed, and controlling a fluid velocity of the fluid between the heating elements in the heating element group, to cool interior of the server.

20 Claims, 7 Drawing Sheets

(58) Field of Classification Search
CPC ........... H05K 7/20836; H05K 7/20145; H05K 7/20281; G05B 15/02; G05B 19/042; G05B 2219/43147
See application file for complete search history.

(56) References Cited

U.S. PATENT DOCUMENTS

| | | | | |
|---|---|---|---|---|
| 8,606,428 | B2* | 12/2013 | Chan | H05K 7/20727 361/679.48 |
| 10,156,876 | B2* | 12/2018 | Kawamura | G06F 1/20 |
| 2003/0011984 | A1* | 1/2003 | Chu | H05K 7/20836 361/679.48 |
| 2003/0216882 | A1* | 11/2003 | Lai | G06F 1/20 702/132 |
| 2004/0070932 | A1* | 4/2004 | Dobbs | H05K 7/20836 361/679.48 |
| 2005/0241810 | A1* | 11/2005 | Malone | F04D 25/166 165/122 |
| 2006/0144138 | A1* | 7/2006 | Yamada | G01F 1/6845 73/204.26 |
| 2006/0152901 | A1* | 7/2006 | Espinoza-Ibarra | F04D 29/382 361/695 |
| 2011/0130891 | A1* | 6/2011 | Nielsen | G06F 1/206 713/320 |
| 2011/0160916 | A1* | 6/2011 | Bahali | H05K 7/20736 700/282 |
| 2011/0176275 | A1* | 7/2011 | Sato | H05K 7/20836 361/695 |
| 2012/0065923 | A1* | 3/2012 | Whiteley | G01K 7/023 374/E7.004 |
| 2012/0215359 | A1* | 8/2012 | Michael | G06F 1/206 700/275 |
| 2012/0215373 | A1* | 8/2012 | Koblenz | G05D 23/1919 700/300 |
| 2012/0218707 | A1* | 8/2012 | Chan | H05K 7/20518 361/679.48 |
| 2013/0083481 | A1* | 4/2013 | Goto | H05K 7/20836 361/695 |
| 2013/0107905 | A1* | 5/2013 | Campbell | G01F 25/10 374/1 |
| 2013/0258582 | A1* | 10/2013 | Shelnutt | H05K 7/20836 361/679.48 |
| 2014/0076513 | A1* | 3/2014 | Iwama | H05K 7/20209 165/11.1 |
| 2014/0117908 | A1* | 5/2014 | Busch | H02P 1/04 318/471 |
| 2015/0282385 | A1* | 10/2015 | Pamley | H05K 7/20836 361/679.48 |
| 2017/0060203 | A1* | 3/2017 | Hagiwara | H04N 1/00 |
| 2017/0082112 | A1* | 3/2017 | Barron | H05K 7/20836 |
| 2017/0097003 | A1* | 4/2017 | Chen | H05K 7/20736 |
| 2017/0269653 | A1* | 9/2017 | Shabbir | H05K 7/20727 |
| 2017/0276140 | A1* | 9/2017 | Iwama | F04D 25/08 |
| 2018/0003186 | A1* | 1/2018 | Matsuura | G06F 1/20 |
| 2018/0035572 | A1* | 2/2018 | Song | H05K 7/20836 |
| 2018/0137076 | A1* | 5/2018 | Shao | G06F 1/20 |
| 2018/0359882 | A1* | 12/2018 | Lovicott | H05K 7/20727 |
| 2018/0363938 | A1* | 12/2018 | Murakami | F24F 11/64 |
| 2019/0361508 | A1* | 11/2019 | Yarragunta | G05D 23/1931 |
| 2020/0134118 | A1* | 4/2020 | Rahardjo | G06F 1/206 |
| 2020/0404812 | A1* | 12/2020 | Gao | H05K 7/20272 |
| 2021/0157375 | A1* | 5/2021 | Drewery | H05K 7/20209 |
| 2021/0333046 | A1* | 10/2021 | Cleland | F25D 31/002 |
| 2022/0057423 | A1* | 2/2022 | Geiger | G01P 1/006 |
| 2022/0221916 | A1* | 7/2022 | Eiland | G06F 1/20 |
| 2022/0221920 | A1* | 7/2022 | Shabbir | G06F 1/20 |
| 2022/0262704 | A1* | 8/2022 | Vijayrao | H01L 23/473 |
| 2023/0070920 | A1* | 3/2023 | Huang | G06F 1/20 |
| 2023/0137596 | A1* | 5/2023 | Gerdes | G06F 1/206 361/695 |
| 2023/0284411 | A1* | 9/2023 | Levitan | H05K 7/20145 361/690 |
| 2023/0345665 | A1* | 10/2023 | Tsuchida | G06F 1/20 |
| 2024/0027277 | A1* | 1/2024 | Suchindran | G06F 11/3037 |
| 2024/0196573 | A1* | 6/2024 | Chen | H05K 7/20163 |
| 2025/0154961 | A1* | 5/2025 | Katabira | H05K 7/20209 |
| 2025/0165049 | A1* | 5/2025 | Carney | F04D 27/004 |

FOREIGN PATENT DOCUMENTS

| | | |
|---|---|---|
| CN | 115494926 A | 12/2022 |
| CN | 116302846 A | 6/2023 |

* cited by examiner

METHOD AND SYSTEM FOR CONTROLLING INTERNAL TEMPERATURE OF SERVER, SERVER, DEVICE, AND MEDIUM

CROSS-REFERENCE TO RELATED APPLICATION

This application claims the priority of the Chinese Patent application filed on May 18, 2023 before the CNIPA, China National Intellectual Property Administration with the application number of 202310561352. 3, and the title of "METHOD AND SYSTEM FOR CONTROLLING INTERNAL TEMPERATURE OF SERVER, DEVICE, MEDIUM, AND SERVER", which is incorporated herein in its entirety by reference.

FIELD

The present application relates to the technical field of servers and more particularly, to a method and system for controlling internal temperature of a server, a device, a non-transitory readable storage medium, and a server.

BACKGROUND

Through the collection, storage, and analysis of data, digital technology permeates and integrates with traditional industries, bringing new opportunities and new prospects for industrial development. As a key infrastructure for data processing, Internet Data Centers (IDCs) play an important role in the development of the digital economy. The "east data, west computing" project has planned 8 computing power hub nodes and 10 data center clusters to promote the development of the digital industry. As the basic constituent unit of the IDC, servers are the core for achieving advanced computing power. With the development of society, the demand for computing power will continue to increase, for example, the rapid development of AI (Artificial Intelligence) and the sustained popularity of related products such as ChatGPT (Chat Generative Pre-trained Transformer), and there may even be further upgraded AI products in the future. These applications require a large amount of computing power behind them, and the computational burden on the IDC servers will be extremely huge.

However, in the face of a large amount of computing power, the servers will inevitably experience a sharp increase in internal temperature and poor internal heat dissipation.

SUMMARY

Some embodiments of the present application provide a method and system for controlling internal temperature of a server, a device, a non-transitory readable storage medium, and a server, to control the fluid state inside the server based on continuous monitoring of the element temperature of the heating elements inside the server and the fluid temperature of the fluid between the heating elements, thereby enhancing the cooling effect inside the server.

In a first aspect, some embodiments of the present application provide a method for controlling internal temperature of a server, applied to a system for controlling the internal temperature of the server, wherein the system for controlling the internal temperature of the server includes at least: a controller and a fluid temperature sensor; the fluid temperature sensor is disposed between heating elements in a heating element group of the server, the heating element group includes a plurality of heating elements located in a same fluid flow direction, the fluid temperature sensor is configured for collecting fluid temperature of fluid between the heating elements in the heating element group; and the method includes:
  acquiring, by the controller, element temperature of the heating elements in the heating element group;
  acquiring, by the controller and the fluid temperature sensor, the fluid temperature of the fluid between the heating elements in the heating element group;
  determining, by the controller, a motor speed of a motor corresponding to the heating element group according to the element temperature and the fluid temperature; and
  controlling, by the controller, the motor speed, and controlling a fluid velocity of the fluid between the heating elements in the heating element group, to cool interior of the server.

In some embodiments, the fluid temperature sensor is an array temperature sensor, and the array temperature sensor includes a plurality of temperature probes;
  the acquiring, by the controller and the fluid temperature sensor, the fluid temperature of the fluid between the heating elements in the heating element group includes:
  acquiring point temperature of a plurality of points corresponding to the plurality of temperature probes by the plurality of temperature probes of the array temperature sensor, and sending the point temperature to the controller by the array temperature sensor;
  determining, by the controller, total point temperature based on the point temperature of the plurality of points; and
  determining, by the controller, the fluid temperature of the fluid between the heating elements in the heating element group based on the total point temperature and a number of the plurality of temperature probes.

In some embodiments, the fluid temperature sensor is an array temperature sensor, and the array temperature sensor includes a plurality of temperature probes;
  the acquiring, by the controller and the fluid temperature sensor, the fluid temperature of the fluid between the heating elements in the heating element group includes:
  acquiring, by the plurality of temperature probes of the array temperature sensor, point temperature of a plurality of points corresponding to the plurality of temperature probes;
  determining, by the array temperature sensor, total point temperature based on the point temperature of the plurality of points;
  determining, by the array temperature sensor, the fluid temperature of the fluid between the heating elements in the heating element group based on the total point temperature and a number of the plurality of temperature probes, and sending the fluid temperature to the controller; and
  acquiring, by the controller, the fluid temperature.

In some embodiments, the array temperature sensor further includes: a wire and a frame; each of the plurality of temperature probes includes a fluid inlet and a fluid outlet that are connected to the wire; the frame and the plurality of temperature probes form a planar array structure; the frame includes a microcavity of a first depth in the fluid flow direction;
  the method further includes:
  regulating, by the fluid inlet, the fluid outlet and the microcavity of the array temperature sensor, a direction of motion of the fluid between the heating elements in the heating element group, to cool the interior of the server.

In some embodiments, the fluid temperature sensor is a single temperature sensor;

the acquiring, by the controller and the fluid temperature sensor, the fluid temperature of the fluid between the heating elements in the heating element group includes:

collecting, by the single temperature sensor, initial fluid temperature of the fluid between the heating elements in the heating element group, and sending the initial fluid temperature to the controller; and converting, by the controller, the initial fluid temperature based on a preset conversion relationship, and determining the fluid temperature of the fluid between the heating elements in the heating element group.

In some embodiments, the fluid temperature sensor is a single temperature sensor;

the acquiring, by the controller and the fluid temperature sensor, the fluid temperature of the fluid between the heating elements in the heating element group includes:

collecting, by the single temperature sensor, initial fluid temperature of the fluid between the heating elements in the heating element group;

converting, by the single temperature sensor, the initial fluid temperature based on a preset conversion relationship, determining the fluid temperature of the fluid between the heating elements in the heating element group, and sending the fluid temperature to the controller; and acquiring, by the controller, the fluid temperature.

In some embodiments, the system for controlling the internal temperature of the server further includes a fluid baffle; the fluid baffle is composed of a first baffle arranged vertically and a second baffle located at a first angle to the first baffle on a side of the fluid temperature sensor, and the fluid baffle is arranged on the side of the fluid temperature sensor;

the method further includes:

guiding, by the first baffle and the second baffle of the fluid baffle, fluid on a side of the heating element group into a space between the heating elements in the heating element group, to change the fluid temperature of the fluid between the heating elements in the heating element group, and to cool the interior of the server.

In some embodiments, the server is any one of a multi-processor server, a blade server, an air-cooled server, and an immersion liquid-cooled server, and the server includes a plurality of heating element groups;

controlling, by the controller, the motor speed, and controlling a fluid velocity of the fluid between the heating elements in the heating element group, to cool interior of the server includes:

controlling, by the controller, the motor speed corresponding to each of the plurality of heating element groups, and controlling the fluid velocity of the fluid between the heating elements in each of the plurality of heating element groups, to cool the interior of the server.

In a second aspect, some embodiments of the present application provides a system for controlling internal temperature of a server, wherein the system for controlling the internal temperature of the server includes at least: a controller and a fluid temperature sensor; the fluid temperature sensor is disposed between heating elements in a heating element group of the server, and the heating element group includes a plurality of heating elements located in a same fluid flow direction; wherein the fluid temperature sensor is configured for collecting fluid temperature of fluid between the heating elements in the heating element group;

the controller is configured for acquiring element temperature of the heating elements in the heating element group;

the controller is configured for acquiring the fluid temperature of the fluid between the heating elements in the heating element group by the fluid temperature sensor;

the controller is configured for determining a motor speed of a motor corresponding to the heating element group according to the element temperature and the fluid temperature; and the controller is configured for controlling the motor speed and controlling a fluid velocity of the fluid between the heating elements in the heating element group, to cool interior of the server.

In some embodiments, the fluid temperature sensor is an array temperature sensor, and the array temperature sensor includes a plurality of temperature probes;

the array temperature sensor is configured for acquiring point temperature of a plurality of points corresponding to the plurality of temperature probes by the plurality of temperature probes, and sending the point temperature to the controller;

the controller is configured for determining total point temperature based on the point temperature of the plurality of points; and the controller is configured for determining the fluid temperature of the fluid between the heating elements in the heating element group based on the total point temperature and a number of the plurality of temperature probes.

In some embodiments, the fluid temperature sensor is an array temperature sensor, and the array temperature sensor includes a plurality of temperature probes;

the array temperature sensor is configured for acquiring point temperature of a plurality of points corresponding to the plurality of temperature probes by the plurality of temperature probes;

the array temperature sensor is configured for determining total point temperature based on the point temperature of the plurality of points;

the array temperature sensor is configured for determining the fluid temperature of the fluid between the heating elements in the heating element group based on the total point temperature and a number of the plurality of temperature probes, and sending the fluid temperature to the controller; and the controller is configured for acquiring the fluid temperature.

In some embodiments, the array temperature sensor further includes: a wire and a frame; each of the plurality of temperature probes includes a fluid inlet and a fluid outlet that are connected to the wire; the frame and the plurality of temperature probes form a planar array structure; the frame includes a microcavity of a first depth in the fluid flow direction; and the array temperature sensor is configured for regulating a direction of motion of the fluid between the heating elements in the heating element group by the fluid inlet, the fluid outlet and the microcavity to cool the interior of the server.

In some embodiments, the fluid temperature sensor is a single temperature sensor;

the single temperature sensor is configured for collecting initial fluid temperature of the fluid between the heating elements in the heating element group, and sending the initial fluid temperature to the controller; and the controller is configured for converting the initial fluid temperature based on a preset conversion relationship, and determining the fluid temperature of the fluid between the heating elements in the heating element group.

In some embodiments, the fluid temperature sensor is a single temperature sensor;

the single temperature sensor is configured for collecting initial fluid temperature of the fluid between the heating elements in the heating element group;

the single temperature sensor is configured for converting the initial fluid temperature based on a preset conversion relationship, determining the fluid temperature of the fluid between the heating elements in the heating element group, and sending the fluid temperature to the controller; and the controller is configured for acquiring the fluid temperature.

In some embodiments, the system for controlling the internal temperature of the server further includes a fluid baffle; the fluid baffle is composed of a first baffle arranged vertically and a second baffle located at a first angle to the first baffle on a side of the fluid temperature sensor, and the fluid baffle is arranged on the side of the fluid temperature sensor; and the fluid baffle is configured for guiding fluid on a side of the heating element group into a space between the heating elements in the heating element group by the first baffle and the second baffle, to change the fluid temperature of the fluid between the heating elements in the heating element group, and to cool the interior of the server.

In some embodiments, the server is any one of a multi-processor server, a blade server, an air-cooled server, and an immersion liquid-cooled server, and the server includes a plurality of heating element groups;

the controller is configured for controlling the motor speed corresponding to each of the plurality of heating element groups, and controlling the fluid velocity of the fluid between the heating elements in each of the plurality of heating element groups, to cool the interior of the server.

In some embodiments, the controller is a microcontroller unit or a baseboard management controller.

In some embodiments, the heating element includes at least one or more of followings: a central processing unit, a graphics processing unit, and a memory module.

In a third aspect, some embodiments of the present application provide a server, including: the system for controlling the internal temperature of the server according to some embodiments of the present application in the second aspect.

In a fourth aspect, some embodiments of the present application provide an electronic device, including: a processor, a memory, and a computer program stored on the memory and running on the processor, wherein the computer program, when executed by the processor, implements operations of the method for controlling the internal temperature of the server according to some embodiments of the present application in the first aspect.

In a fifth aspect, some embodiments of the present application provide a non-transitory computer-readable storage medium, wherein a computer program is stored on the non-transitory computer-readable storage medium, and the computer program, when executed by a processor, implements operations of the method for controlling the internal temperature of the server according to some embodiments of the present application in the first aspect.

The method for controlling internal temperature of the server provided in some embodiments of the present application is applied to the system for controlling the internal temperature of the server, and the method includes: acquiring, by the controller, element temperature of the heating elements in the heating element group; acquiring, by the controller and the fluid temperature sensor, the fluid temperature of the fluid between the heating elements in the heating element group; determining, by the controller, a motor speed of a motor corresponding to the heating element group according to the element temperature and the fluid temperature; and controlling, by the controller, the motor speed, and controlling a fluid velocity of the fluid between the heating elements in the heating element group, to cool interior of the server. Through the method for controlling internal temperature of the server in some embodiments of the present application, the fluid temperature sensor is arranged between the heating elements in the heating element group of the server to collect the fluid temperature of the fluid between the heating elements in the heating element group. When the server is working, the element temperature of the heating elements in the heating element group is collected in real time, and the fluid temperature of the fluid between the heating elements in the heating element group is also collected in real time, to effectively sense the state changes of the fluid during the transmission process of the fluid in the server chassis. The motor speed of the motor corresponding to the heating element group is determined by the collected element temperature and fluid temperature. Therefore, by controlling the motor speed of the motor corresponding to the heating element group, the fluid velocity between the heating elements is controlled, to achieve cooling the interior of the server, to reduce the impact of the state changes of the fluid on subsequent cooling of the heating elements, thereby enhancing the cooling effect of components of the server.

BRIEF DESCRIPTION OF THE DRAWINGS

In order to more clearly illustrate the technical solutions of some embodiments of the present application, a brief introduction will be given to the accompanying drawings required for the description of some embodiments of the present application. It is obvious that the accompanying drawings in the following description are only some embodiments of the present application. For those skilled in the art, other drawings may be obtained based on these drawings without creative work.

DETAILED DESCRIPTION

The following will provide a clear and complete description of the technical solutions in some embodiments of the present application, combined with the accompanying drawings of the present application. Obviously, the described embodiments are part of the present application and not all of it. Based on some embodiments in the present application, all other embodiments obtained by persons skilled in the art without creative work are within the scope of protection of the present application.

As before, IDC revealed a significant issue in the face of massive computing power growth, which is the cooling problem of computing chips. As is well known, the temperature rise of chips such as CPU (Central Processing Unit) and GPU (Graphics Processing Unit) in the servers during computation will significantly reduce device performance, such as decreasing operating speed, reducing lifespan, and increasing power consumption. Especially for high-performance servers, after low-temperature fluid enters the server chassis and cools the first one of chips it passes through, the fluid state changes, which affects the cooling of subsequent chips. That is, half of the chips will be adversely affected. Among them, the change in fluid velocity is particularly significant and commonly exists in existing server products. Therefore, how to effectively perceive the state changes of the fluid during transmission process of the fluid in the server chassis and make corresponding adjustments to the fluid to enhance the cooling effect of the components of the server is the issue that needs to be considered in the present application.

Figure 1:
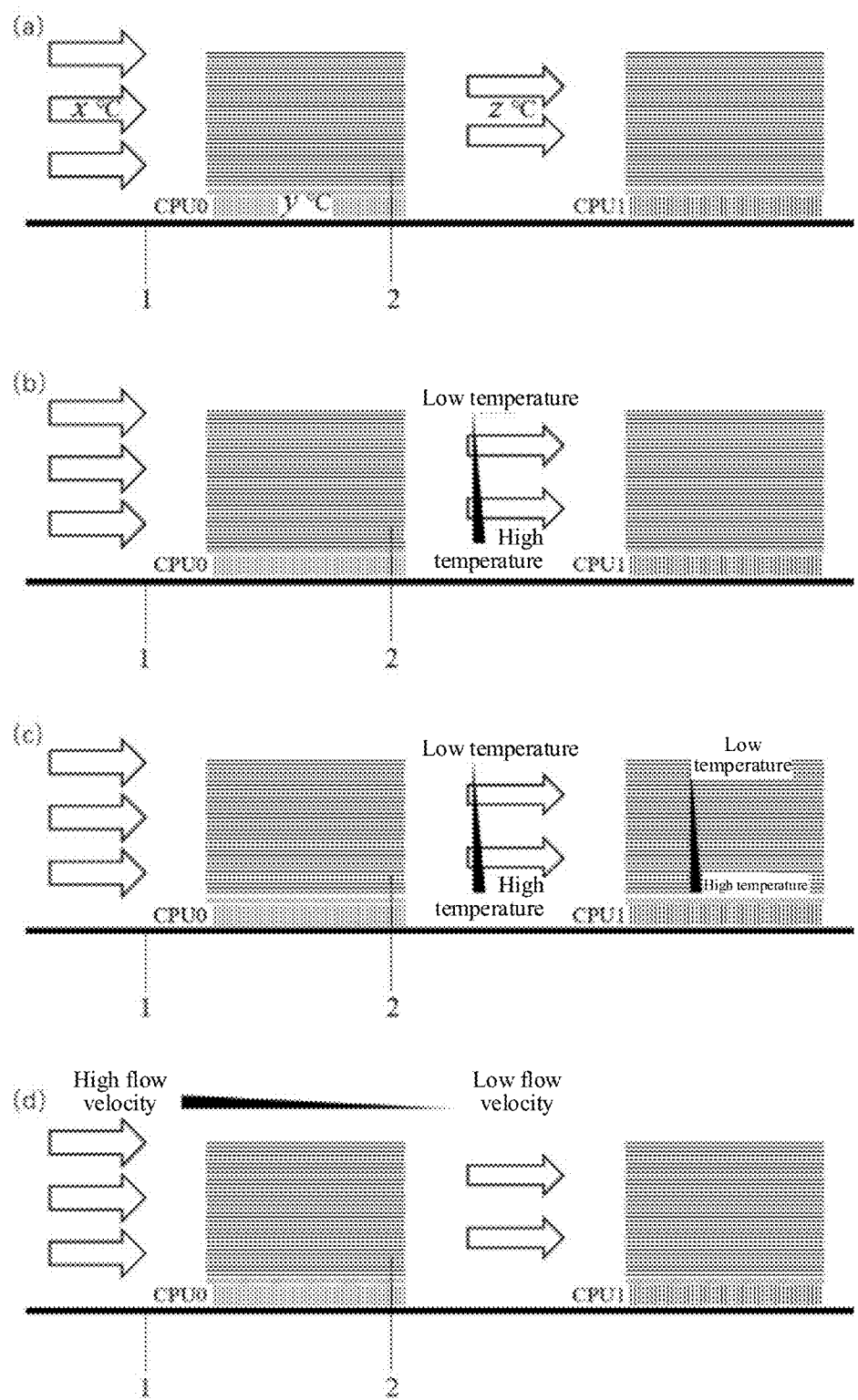
FIG. 1 is a schematic diagram of state changes of fluid inside a server according to some embodiments of the present application.

In related art, solutions for cooling the internal chips of servers through the fluid have not taken into account the corresponding changes in the fluid state after the fluid passes through the front row of chips for heat exchange. The changed fluid will also have adverse effects on the cooling of subsequent chips, especially on cooling more than half of the chips in the chassis. Based on this, some embodiments of the present application have analyzed the changes in the fluid states as follows: as shown in FIG. 1, FIG. 1 is a schematic diagram of state changes of the fluid inside the server shown according to some embodiments of the present application. FIG. 1 is a side view, among them, in FIG. 1, 1 represents the motherboard and 2 represents the heat sink of the heating element; diagram (a) in FIG. 1 is a schematic diagram of changes in fluid temperature, diagram (b) in FIG. 1 is a schematic diagram of uniformity of changes in the fluid temperature, diagram (c) in FIG. 1 is a schematic diagram of uniformity of changes in the fluid temperature and uniformity of changes in the chip temperature, and diagram (d) in FIG. 1 is a schematic diagram of changes in the fluid velocity.

Among them, firstly, changes in the fluid temperature. As shown in diagram (a) in FIG. 1, after the low-temperature fluid (x° C.) cools CPU0 (y° C.), the temperature (z° C.) of the fluid changes. The results of the fluid experiment testing are as follows: x1=22° C., y1=57° C., z1=52° C.; x2=22° C., y2=65° C., z2=57° C.; X3=22° C., y3=72° C., z3=60° C. Obviously, the temperature of the fluid after the heat exchange increases with the increasing temperature of CPU0. However, there is a significant difference in the cooling effect of fluids with high temperature value z and low temperature value x on the CPU. For example, when the temperature of CPU0 is y3=72° C., the temperature of the fluid after the heat exchange is z3=60° C. Compared to x3=22° C., the cooling effect of the fluid with high temperature of 60° C. on CPU1 is very inefficient.

Secondly, the uniformity of changes in the fluid temperature. The results of the fluid experiment testing are as follows: when x1=22° C. and y1=57° C., the temperature value z of the airflow changes from 46° C. to 52° C. from top to bottom (as shown in diagram (b) in FIG. 1). At the same time, the temperature of the heat sink of CPU1 is also uneven, which is gradually increasing from top to bottom (as shown in diagram (c) in FIG. 1). Therefore, when the high-temperature fluid at the bottom exchanges heat with the high-temperature position at the bottom of the heat sink again, its cooling effect will be very poor, especially when CPU1 is a MM (Memory Module), since MM being level with the bottom of CPU0 in height, it may only interact with the high-temperature fluid at the bottom, and the cooling effect will be very poor.

Thirdly, changes in the fluid velocity. After the fluid interacts with the heat sink of CPU0, not only the fluid temperature increases, but also the fluid velocity decreases (as shown in diagram (d) in FIG. 1).

Fourth, changes in the fluid flow direction. In addition, after interacting with the chip, the direction of motion of the fluid will also change. For example, after the fluid collides with the grid-shaped heat sink, the direction of the motion of the fluid will diverge. Obviously, these changes will have adverse effects on the cooling of the chip.

Therefore, in order to at least partially solve one or more of the above problems and other potential problems, some embodiments of the present application provides a method for controlling internal temperature of a server. During the operation of the server, after the fluid temperature sensor senses a change in the fluid temperature during fluid heat exchange, the motor speed of the motor corresponding to the heating element group is regulated based on the sensed element temperature of the heating elements and the sensed fluid temperature of the fluid between the heating elements. By regulating the motor speed, the fluid velocity of the fluid between the heating elements is controlled, to cool the interior of the server. The cooling of the subsequent heating elements is achieved by increasing the fluid velocity in real time and reasonably, so as to reduce the impact of fluid state changes on the cooling of the subsequent heating elements, thereby enhancing the cooling effect of the components of the server.

Figure 2:
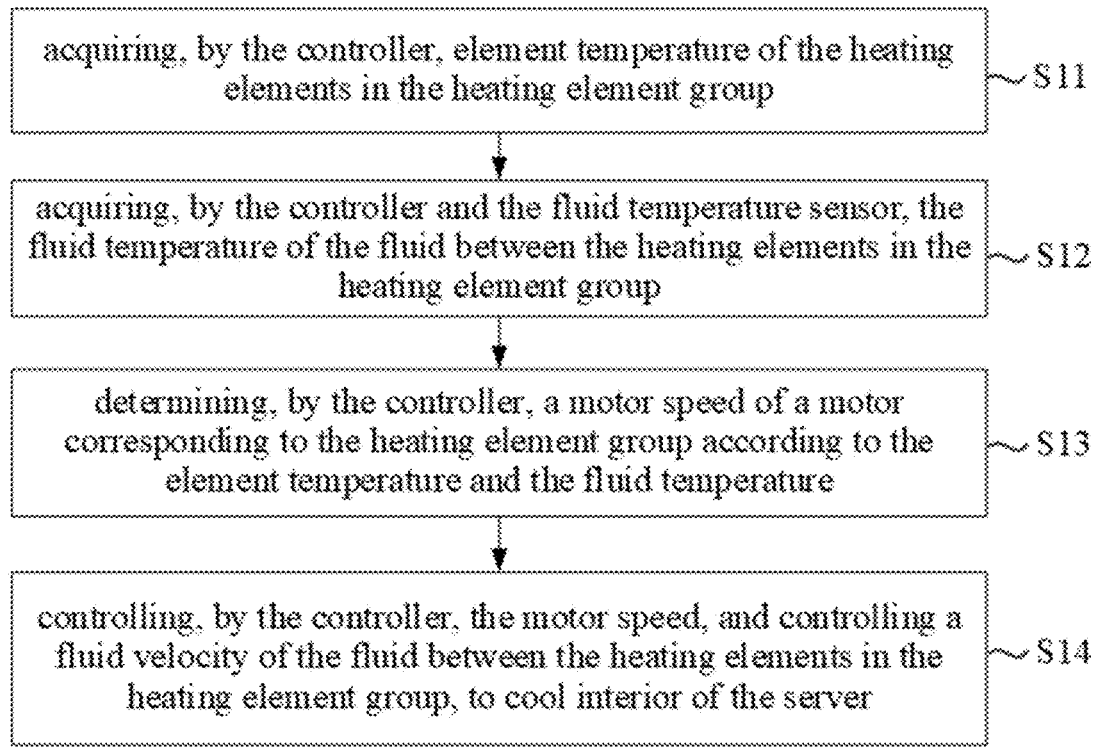
FIG. 2 is a flowchart of steps of a method for controlling internal temperature of a server according to some embodiments of the present application.

Referring to FIG. 2, FIG. 2 is a flowchart of steps of a method for controlling internal temperature of a server according to some embodiments of the present application.

The method for controlling the internal temperature of the server provided in some embodiments of the present application may be applied to the system for controlling the internal temperature of the server, and the system for controlling the internal temperature of the server in some embodiments of the present application includes at least: a controller and a fluid temperature sensor. Among them, the controller is used for acquiring and calculating the internal data of the server, and controlling the motor. The fluid temperature sensor is disposed on a path traveled after the heat exchange by the fluid between the heating elements in the heating element group of the server, and configured for collecting the fluid temperature of the fluid between the heating elements in the heating element group. In some embodiments of the present application, the heating element group includes a plurality of heating elements located in a same fluid flow direction (a same fluid flow path), the heating element is a functional chip arranged inside the server chassis. In some embodiments of the present application, the fluid may be gas or liquid, and when it is liquid, it is non-conductive liquid. Among them, the fluid may be a cold fluid, mainly used to cool the heating elements. As shown in FIG. 2, the method for controlling the internal temperature of the server in some embodiments of the present application may include the following steps:

Step S11: acquiring, by the controller, element temperature of the heating elements in the heating element group.

In some embodiments of the present application, during the operation of the server, the motor inside the server works, and the fluid emitted by the motor cools the heating elements. During the cooling process, the controller acquires the element temperatures of all heating elements in the heating element group. Among them, in some embodiments of the present application, the heating elements in the heating element group are multiple front and rear heating elements in the same fluid flow direction. For example, the heating elements arranged in the same row on the server motherboard may form one heating element group. For example, the element temperature of each heating element may be collected through the built-in temperature sensor of the heating element, and the element temperature may be sent to the controller, so that the controller may acquire the element temperature of all heating elements in the heating element group.

Step S12: acquiring, by the controller and the fluid temperature sensor, the fluid temperature of the fluid between the heating elements in the heating element group.

In some embodiments of the present application, the fluid temperature sensor is disposed between the heating elements in the heating element group. Therefore, the fluid temperature of the fluid between the heating elements may be collected by the fluid temperature sensor, and then the fluid temperature sensor sends the collected fluid temperature to the controller, so that the controller may acquire the fluid temperature of the fluid between the heating elements in the heating element group. Among them, the fluid temperature sensor in some embodiments of the present application may be an array structure or a single structure. The array structure is more accurate in sensing accuracy, but the material cost increases. The single structure may reduce material cost but there may be errors in the sensing accuracy. However, both structures may be adopted.

Some embodiments of the present application continuously monitor the fluid temperature of the fluid inside the server through the fluid temperature sensor, so that the state of the fluid may be regulated according to the temperature changes of the fluid inside the server, to improve the subsequent cooling effect of the fluid and achieve cooling the interior of the server.

Step S13: determining, by the controller, a motor speed of a motor corresponding to the heating element group according to the element temperature and the fluid temperature.

In some embodiments of the present application, after acquiring the element temperature of the heating elements in the heating element group and the fluid temperature of the fluid between the heating elements in the heating element group, the controller may determine the motor speed of the motor corresponding to the heating element group according to the acquired element temperature and fluid temperature. Among them, the heating element group is provided with a dedicated motor, that is, the heating element group is provided with a motor corresponding to this heating element group, to be used to emit fluid for cooling the heating elements in its corresponding heating element group. When considering the motor speed, some embodiments of the present application not only take into account the element temperatures of all front and rear heating elements of the heating element group, but also consider the fluid temperature of the fluid between the heating elements in the heating element group, so as to regulate the corresponding motor speed in real time based on the real-time temperature of the fluid and the real-time temperature of the elements.

Step S14: controlling, by the controller, the motor speed, and controlling a fluid velocity of the fluid between the heating elements in the heating element group, to cool interior of the server.

In some embodiments of the present application, after determining the motor speed of the motor corresponding to the heating element group, the controller may control the motor speed of the motor corresponding to the heating element group to be the motor speed determined according to the element temperature and fluid temperature, so as to control the fluid velocity of the fluid emitted by the motor corresponding to the heating element group by controlling the motor speed of the motor corresponding to the heating element group, thereby controlling the fluid velocity of the fluid between the heating elements in the heating element group, to cool the interior of the server, thus improving the fluid velocity of the fluid between the heating elements, and enhancing the cooling effect of the fluid between the heating elements on subsequent heating elements.

In some embodiments of the present application, during the heat exchange process of the heating elements of the server through the fluid, after the fluid temperature sensor senses the temperature change of the fluid, the motor speed of the motor corresponding to the heating element group is regulated based on the sensed element temperature of the heating element and the sensed fluid temperature of the fluid between the heating elements. By regulating the motor speed, the fluid velocity of the fluid between the heating elements is increased to achieve cooling of the subsequent heating elements, in order to reduce the impact of fluid state changes on cooling of the subsequent heating elements and enhance the cooling effect of the components of the server.

Among them, in some embodiments of the present application, the number of the motors corresponding to the heating element group may be one or more, and some embodiments of the present application do not limit this, for example, each heating element group corresponds to 2 motors, and so on. After determining the motor speed of the motor corresponding to the heating element group, it may regulate the speed of all of the motors corresponding to the heating element group, or to regulate the speed of one or more of the motors corresponding to the heating element group, and some embodiments of the present application do not limit this.

In some embodiments, when two heating elements are included in the heating element group, and one fluid temperature sensor is disposed between the two heating elements of the heating element group, the controller may acquire the element temperature of the two heating elements and the fluid temperature of the fluid between the two heating elements, so as to determine the motor speed of the motor corresponding to the heating element group based on the element temperature of the two heating elements and the fluid temperature of the fluid between the two heating elements. By controlling the corresponding motor to execute the motor speed, the fluid velocity of the fluid emitted by the motor to is controlled (increasing velocity), thereby further improving the fluid velocity of the fluid between the two heating elements to cool the heating elements, so that the fluid between the two heating elements may have a good cooling effect on the subsequent heating elements.

In some embodiments, when N heating elements (which may be CPUs, GPUs, or MMs) are included in the heating element group and N is a natural number greater than or equal to 3, and the N heating elements are arranged in sequence along the direction of motion of the heat dissipation fluid, N−1 fluid temperature sensors are disposed between the N heating elements in the heating element group. The controller may acquire the element temperature of each heating element of the N heating elements, as well as the N−1 fluid temperature values of the fluid between the N heating elements, so that the motor speed of the motor corresponding to the heating element group may be determined based on the element temperature of the N heating elements and the N−1 fluid temperature values. By controlling the corresponding motor to execute the motor speed, the controller controls the fluid velocity (increasing velocity) of the fluid emitted by the motor. Thus, the fluid velocity of the fluid between N heating elements may be further increased to cool the heating elements, and the fluid between N heating elements may have a good cooling effect on the subsequent heating elements as much as possible.

Combined with the above embodiments, some embodiments of the present application also provide a method for controlling the internal temperature of the server. In this method, the fluid temperature sensor is an array temperature sensor. The above step S12 may include steps S21 to S23:

Step S21: acquiring point temperature of a plurality of points corresponding to a plurality of temperature probes by the plurality of temperature probes of the array temperature sensor, and sending the point temperature to the controller by the array temperature sensor.

Some embodiments of the present application take into account the non-uniformity of the fluid temperature changes of the fluid between the heating elements (as shown in diagram (b) in FIG. 1), where the temperature of the fluid at different positions is different. Therefore, the array temperature sensor is disposed between the heating elements in the heating element group, which includes the plurality of temperature probes, and each temperature probe corresponds to its own temperature measurement point. The array temperature sensor may collect the point temperature of the plurality of points corresponding to the plurality of temperature probes between the heating elements through the plurality of temperature probes, and send the collected point temperature of the plurality of points to the controller for the controller to perform subsequent calculations.

Step S22: determining, by the controller, total point temperature based on the point temperature of the plurality of points.

In some embodiments of the present application, after receiving the point temperatures of the plurality of points sent by the array temperature sensor, the controller may determine the total point temperature based on the point temperature of the plurality of points. Among them, the total point temperature of some embodiments of the present application is the sum of the point temperature of the plurality of points.

Step S23: determining, by the controller, the fluid temperature of the fluid between the heating elements in the heating element group based on the total point temperature and a number of the plurality of temperature probes.

In some embodiments of the present application, after the controller determines the total point temperature, the average temperature of the plurality of temperature probes (i.e., the average temperature or weighted average temperature of the fluid in the detection area of the array temperature sensor) may be determined based on the total point temperature and the number of the plurality of temperature probes, so as to determine the average temperature of the plurality of temperature probes as the fluid temperature of the fluid between the heating elements in the heating element group. Among them, the number of the plurality of temperature probes may be manually input into the controller when arranging the array temperature sensor on the server in advance, or carried and sent to the controller by the array temperature sensor when sending the point temperature of the plurality of points to the controller, and some embodiments of the present application do not limit this.

In some embodiments of the present application, the point temperature of the plurality of points is collected by the array temperature sensor and the average temperature of the fluid in the detection area of the array temperature sensor is calculated by the controller, thereby determining the average temperature of the plurality of temperature probes as the fluid temperature of the fluid between the heating elements in the heating element group. The array temperature sensor is more accurate in the sensing accuracy, thereby further improving the control effect of the fluid velocity.

Combined with the above embodiments, some embodiments of the present application further provide a method for controlling the internal temperature of a server. In this method, the fluid temperature sensor is an array temperature sensor. The above step S12 may include steps S31 to S34:

Step S31: acquiring, by the plurality of temperature probes of the array temperature sensor, point temperature of a plurality of points corresponding to the plurality of temperature probes.

Some embodiments of the present application take into account the non-uniformity of the fluid temperature changes of the fluid between the heating elements, and the temperature of the fluid at different positions is different. Therefore, the array temperature sensor is disposed between the heating elements in the heating element group, which includes the plurality of temperature probes, and each temperature probe corresponds to its own temperature measurement point. The array temperature sensor may collect the point temperature of the plurality of points corresponding to the plurality of temperature probes between the heating elements through the plurality of temperature probes.

Step S32: determining, by the array temperature sensor, total point temperature based on the point temperature of the plurality of points.

In some embodiments of the present application, after receiving the point temperatures of the plurality of points, the array temperature sensor may determine the total point temperature based on the point temperature of the plurality of points. Among them, the total point temperature of some embodiments of the present application is the sum of the point temperature of the plurality of points.

Step S33: determining, by the array temperature sensor, the fluid temperature of the fluid between the heating elements in the heating element group based on the total point temperature and a number of the plurality of temperature probes, and sending the fluid temperature to the controller.

In some embodiments of the present application, after the array temperature sensor determines the total point temperature, the average temperature of the plurality of temperature probes (i.e., the average temperature of the fluid in the detection area of the array temperature sensor) may be determined based on the total point temperature and the number of the plurality of temperature probes, so as to determine the average temperature of the plurality of temperature probes as the fluid temperature of the fluid between the heating elements in the heating element group, and send the fluid temperature of the fluid between the heating elements in the heating element group to the controller in the system for controlling the internal temperature of the server.

Step S34: acquiring, by the controller, the fluid temperature.

In some embodiments of the present application, the controller may acquire the fluid temperature of the fluid between the heating elements in the heating element group by receiving the fluid temperature of the fluid between the heating elements in the heating element group sent by the array temperature sensor, and then determine the motor speed of the motor corresponding to the heating element group based on the fluid temperature and the acquired element temperature.

Figure 3:
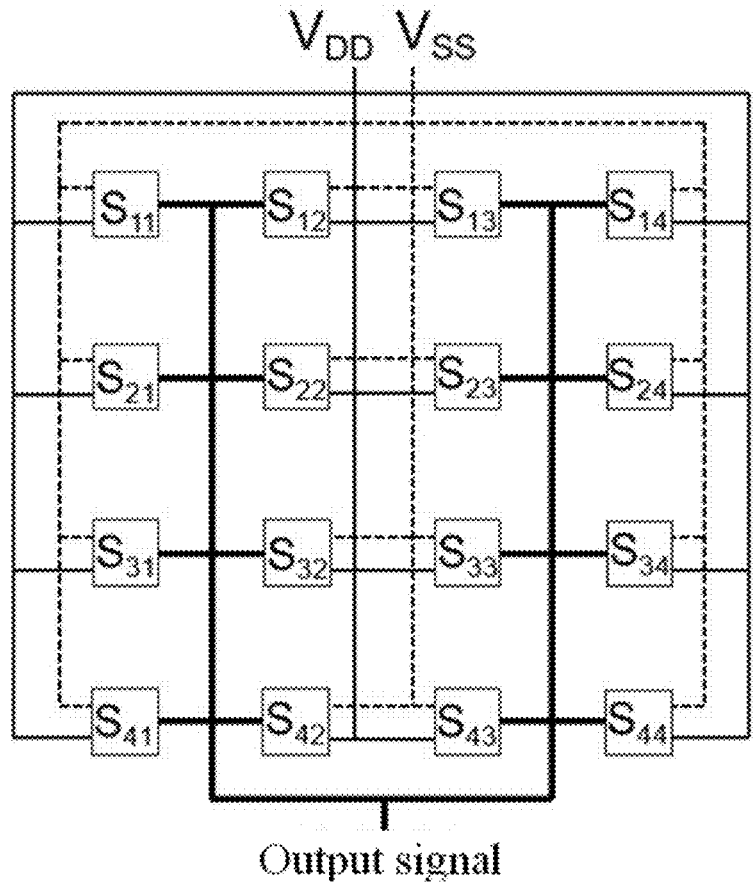
FIG. 3 is a schematic diagram of power supply and signal output of an array temperature sensor according to some embodiments of the present application.

As shown in FIG. 3, FIG. 3 is a schematic diagram of the power supply and signal output of an array temperature sensor according to some embodiments of the present application. Among them, FIG. 3 shows the working principle of an N×M (N=4, M=4) array temperature sensor. $S_{11}$ to $S_{44}$ in FIG. 3 are the plurality of temperature probes in the array temperature sensor, and the label 5 is the probe part. Among them, sources (VSS) of all sensor probes (from $S_{11}$ to $S_{44}$) are commonly connected, drains (VDD) are commonly connected, and output signals (Output) are also commonly connected. The calculation method for the output signals Output is as follows:

$$\sum_{i=11}^{NM} S_i = S_{11} + S_{12} + S_{13} + \ldots + S_{NM} \quad (1)$$

$$\text{Output} = \sum_{i=11}^{NM} S_i \div (N \times M) \quad (2)$$

Among them, the average temperature of the fluid in the detection area of the array temperature sensor is defined by summing up the collected temperature values of all temperature probes (as shown in equation (1)), and then dividing by the number of temperature probes (as shown in equation (2)), to determine the average temperature as the fluid temperature of the fluid between the heating elements in the heating element group.

In some embodiments of the present application, the point temperature of the plurality of points is collected by the array temperature sensor and the average temperature of the fluid in the detection area is calculated. The calculated average temperature of the plurality of temperature probes is determined as the fluid temperature of the fluid between the heating elements in the heating element group, and then the fluid temperature is transmitted to the controller to control the motor speed and fluid velocity based on the element temperature and the fluid temperature. In this way, due to the more accurate sensing accuracy of the array temperature sensor, the control effect of the fluid velocity may be further improved.

Combined with the above embodiments, some embodiments of the present application also provide a method for controlling the internal temperature of the server. In this method, the array temperature sensor disposed between the heating elements may include not only the plurality of temperature probes, but also wires and a frame. Among them, each temperature probe is connected to the wire, and each temperature probe includes a fluid inlet and a fluid outlet for easy sampling of the fluid. In addition, the frame and the plurality of temperature probes may form a planar array structure, and the frame is composed of metal or plastic rectangular thin sheets, where the rectangular thin sheets may be rectangular sheets with thicknesses within a preset value. The preset value depends on product requirements and project situations, and some embodiments of the present application do not limit specific values.

In addition, the frame of the array temperature sensor has a certain depth in the fluid flow direction, which is equivalent to forming a microcavity. That is to say, the frame of some embodiments of the present application includes a microcavity with a first depth in the fluid flow direction, that is, the frame with a thickness being the first depth forms the microcavity with the first depth for regulating the direction of the fluid. Among them, the first depth in some embodiments of the present application may be freely set according to human experience or needs, and some embodiments of the present application do not make any specific limitations on the specific value of the first depth.

Figure 4:
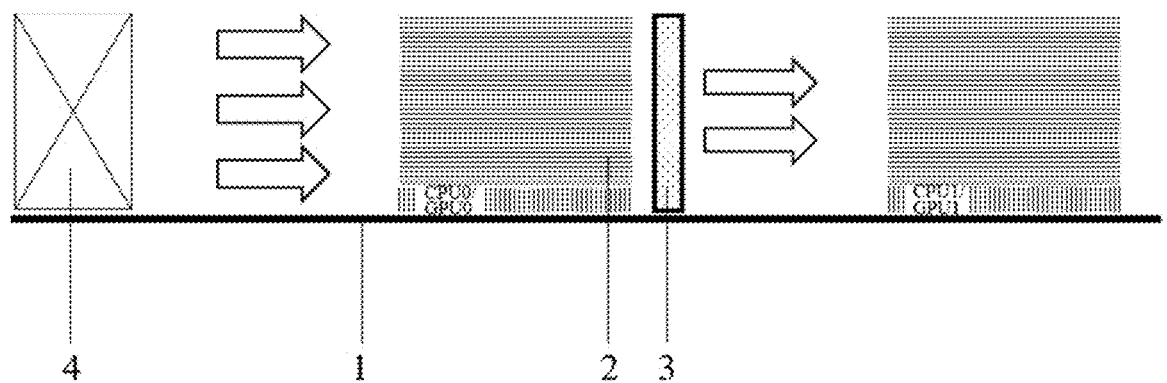
FIG. 4 is a schematic diagram of a position of an array temperature sensor according to some embodiments of the present application.

As shown in FIG. 4, FIG. 4 is a schematic diagram of the position of an array temperature sensor provided in some embodiments of the present application. Among them, FIG. 4 is a side view of the position of the array temperature sensor. FIG. 4 shows the position of the array temperature sensor 3 on the motherboard 1, located between the heating element 0 (CPU0/GPU0) and the heating element 1 (CPU1/GPU1). The fluid is emitted from the motor 4, and after exchanging heat with the heat sink 2 of the heating element 0 (CPU0/GPU0), the fluid temperature may be sensed by the array temperature sensor 3. The heating element in the figure may be a CPU, GPU, or MM.

Figure 5:
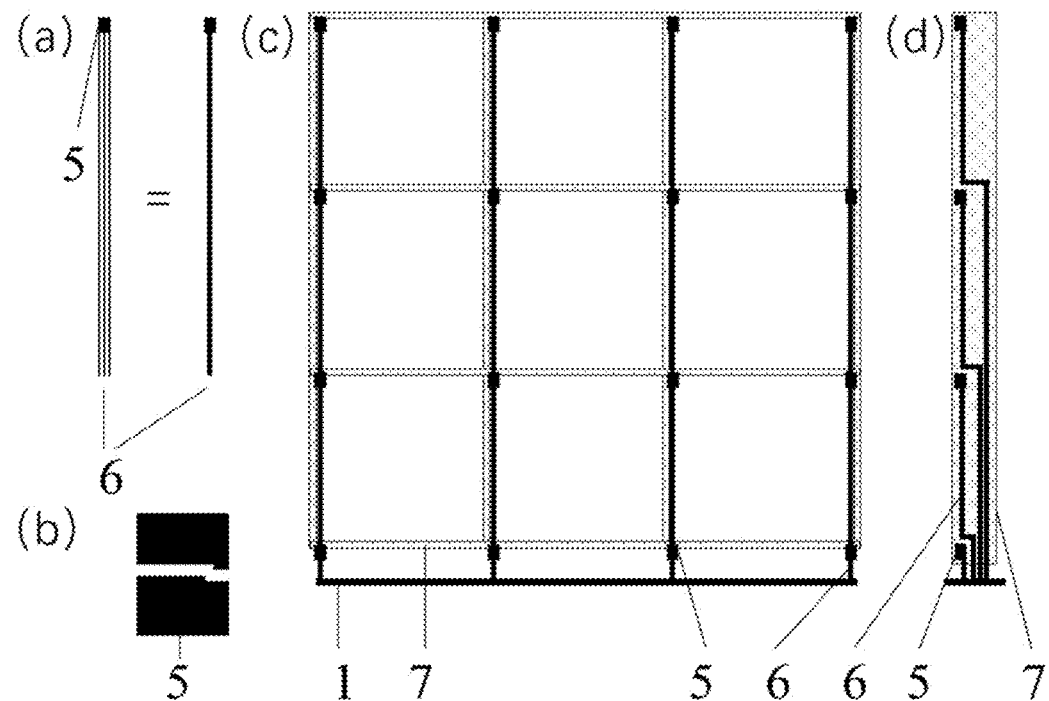
FIG. 5 is a schematic diagram of a structure of an array temperature sensor according to some embodiments of the present application.

As shown in FIG. 5, FIG. 5 is a schematic structural diagram of an array temperature sensor provided in some embodiments of the present application. Among them, as shown in FIG. 5, FIG. 5 is a schematic structural diagram of the array temperature sensor 3 in FIG. 4, that is, an N×M array temperature sensor, whose frame and multiple temperature probes form the planar array structure. The planar array temperature sensor includes a sensor probe part 5 and its wire part 6 (as shown in diagram (a) in FIG. 5), and the probe part 5 includes the fluid inlet and the fluid outlet (as shown in diagram (b) in FIG. 5), which facilitates fluid sampling. The frame shown in diagram (c) in FIG. 5 is obtained through processing, which may also be an array structure with more pixels. The frame is composed of the metal or the plastic rectangular sheets 7. The probe part 5 of the temperature sensor is installed at the position shown in diagram (c) (front view) and diagram (d) (side view) in FIG.

5, and the wire part 6 is arranged. The entire structure is installed on the motherboard 1.

In some embodiments of the present application, in addition to the above steps, it may also include step S41:

Step S41: regulating, by the fluid inlet, the fluid outlet and the microcavity of the array temperature sensor, a direction of motion of the fluid between the heating elements in the heating element group, to cool the interior of the server.

In some embodiments of the present application, after the fluid exchanges heat with the front heating elements in the heating element group, it collides with the heat sink of the heating elements, causing the direction of motion of the fluid to change and diverge in all directions. At this time, through the array temperature sensors disposed between the heating elements in some embodiments of the present application, the fluid between the heating elements enters the array temperature sensor through the fluid inlet and the fluid outlet of the plurality of temperature probes in the array temperature sensor, and may flow out of the array temperature sensor through the microcavity in the array temperature sensor, causing the direction of motion of the fluid flowing out of the array temperature sensor to change from divergence to concentration. Therefore, through the fluid inlet, the fluid outlet, and the microcavities of the array temperature sensor, the direction of motion of the fluid between the heating elements in the heating element group may be regulated to achieve good cooling of the subsequent heating elements and achieve cooling the interior of the server.

In some embodiments of the present application, the direction of motion and the fluid velocity of the fluid between the heating elements may be controlled simultaneously to achieve more accurate cooling effect inside the server. The fluid confinement function inherent in the frame of the array temperature sensor, that is, the fluid inlet, the fluid outlet and the microcavities of the array temperature sensor, may be used to regulate the direction of motion of the fluid between the heating elements in the heating element group. This allows for further optimization of the cooling effect on the subsequent heating elements on the basis of controlling the fluid velocity of the fluid between the heating elements. That is to say, some embodiments of the present application provide a dual function component design for the array temperature sensors, achieving their dual functions of sensing fluid temperature and modulating fluid direction.

Figure 6:
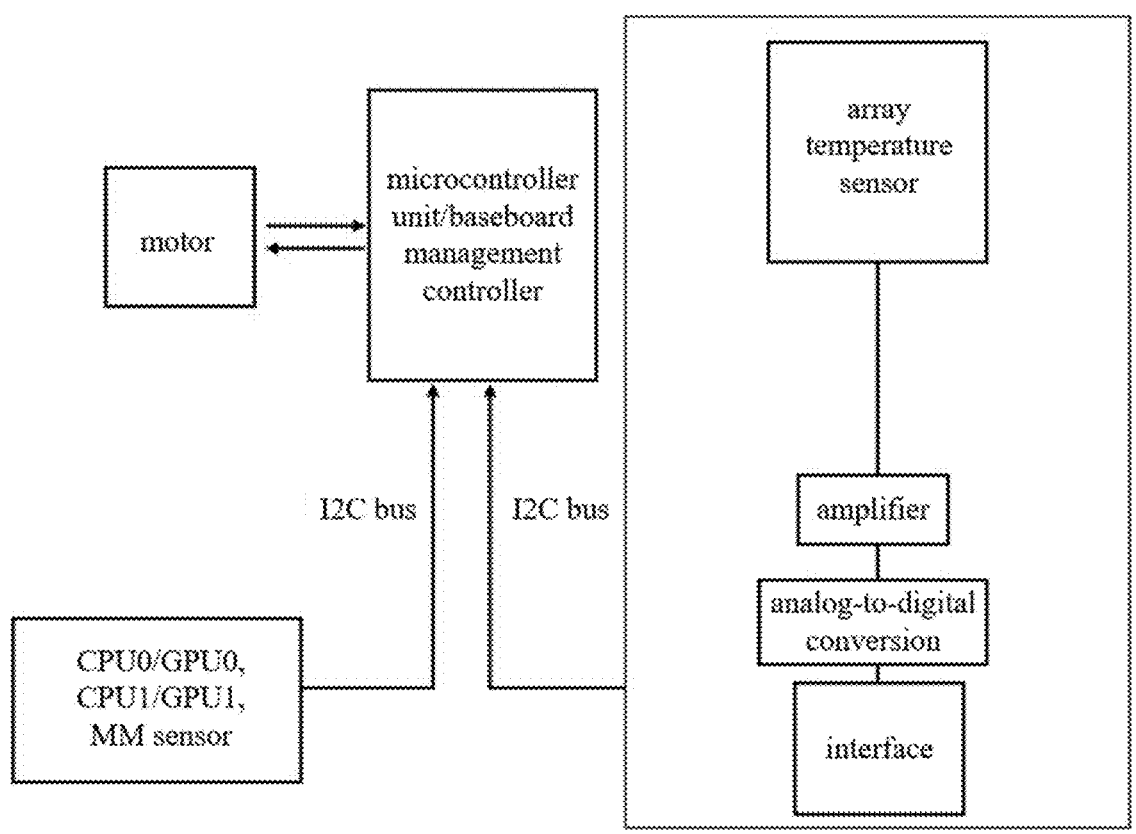
FIG. 6 is a fluid sensing-control topology diagram for array temperature sensors according to some embodiments of the present application.

As shown in FIG. 6, FIG. 6 is a fluid sensing-control topology diagram for array temperature sensors according to some embodiments of the present application. Among them, as shown in FIG. 6, FIG. 6 may be understood as a schematic diagram of the working process of the array temperature sensor. The controller may be a microcontroller unit MCU/ baseboard management controller BMC. After obtaining the fluid temperature value transmitted by the array temperature sensor through the I2C (Inter-Integrated Circuit) bus and the element temperature value transmitted by the heating elements (such as CPU0/GPU0, CPU1/GPU1, MM sensor) through the I2C bus, the controller may cool the heating elements by changing the motor speed.

Combined with any of the above embodiments, some embodiments of the present application also provide the method for controlling the internal temperature of the server. In this method, the fluid temperature sensor is a single temperature sensor, and step S12 may include steps S51 and S52:

Step S51: collecting, by the single temperature sensor, initial fluid temperature of the fluid between the heating elements in the heating element group, and sending the initial fluid temperature to the controller.

In some embodiments of the present application, there is only one temperature probe in the single temperature sensor disposed between the heating elements, and the accuracy of the fluid temperature measured by the single temperature sensor is not very high. Based on this, some embodiments of the present application may determine the fluid temperature collected by the single temperature sensor as the initial fluid temperature, and then process the initial fluid temperature to obtain a more accurate fluid temperature. Therefore, in some embodiments of the present application, after collecting the initial fluid temperature of the fluid between the heating elements in the heating element group, the single temperature sensor may send the initial fluid temperature to the controller.

Step S52: converting, by the controller, the initial fluid temperature based on a preset conversion relationship, and determining the fluid temperature of the fluid between the heating elements in the heating element group.

In some embodiments of the present application, the controller stores the preset conversion relationship, which is used to convert the fluid temperature collected by the single temperature sensor into the average temperature between the point temperature of the plurality of points collected by the array temperature sensor. In some embodiments of the present application, the plurality of comparative experiments may be conducted, the fluid temperature at the same position may be collected by the single temperature sensor and the array temperature sensor. The collection results obtained respectively may be analyzed to obtain the conversion relationship between the two, and the conversion relationship may be stored in the controller as the preset conversion relationship.

After obtaining the initial fluid temperature sent by the single temperature sensor, the controller may convert (including correction) the initial fluid temperature based on the preset conversion relationship, obtain the converted fluid temperature, and determine the converted fluid temperature as the fluid temperature of the fluid between the heating elements in the heating element group.

In some embodiments of the present application, the initial fluid temperature is collected by the single temperature sensor and converted and calculated by the controller, to determine the fluid temperature obtained by converting the initial fluid temperature based on the preset conversion relationship as the fluid temperature of the fluid between the heating elements in the heating element group. The single temperature sensor may reduce the material cost, although there may be errors in sensing accuracy, converting the initial fluid temperature through the preset conversion relationship and then using it to determine the motor speed may reduce the material cost and improve the control effect of the fluid velocity.

Combined with any of the above embodiments, some embodiments of the present application also provide the method for controlling the internal temperature of the server. In this method, the fluid temperature sensor is a single temperature sensor, and step S12 may include steps S61 to S63:

Step S61: collecting, by the single temperature sensor, initial fluid temperature of the fluid between the heating elements in the heating element group.

In some embodiments of the present application, there is only one temperature probe in the single temperature sensor disposed between the heating elements, and the accuracy of the fluid temperature measured by the single temperature sensor is not very high. Based on this, some embodiments of the present application may determine the fluid temperature collected by the single temperature sensor as the initial fluid temperature, and then process the initial fluid temperature to obtain a more accurate fluid temperature.

Step S62: converting, by the single temperature sensor, the initial fluid temperature based on a preset conversion relationship, determining the fluid temperature of the fluid between the heating elements in the heating element group, and sending the fluid temperature to the controller.

In some embodiments of the present application, the single temperature sensor stores the preset conversion relationship, which is used to convert the fluid temperature collected by the single temperature sensor into the average temperature between the point temperature of the plurality of points collected by the array temperature sensor. In some embodiments of the present application, the plurality of comparative experiments may be conducted, the fluid temperature at the same position may be collected by the single temperature sensor and the array temperature sensor. The collection results obtained respectively may be analyzed to obtain the conversion relationship between the two, and the conversion relationship may be stored in the single temperature sensor as the preset conversion relationship.

After collecting the initial fluid temperature, the single temperature sensor may convert the initial fluid temperature based on the preset conversion relationship, obtain the converted fluid temperature, and determine the converted fluid temperature as the fluid temperature of the fluid between the heating elements in the heating element group, thereby sending the fluid temperature of the fluid between the heating elements in the heating element group to the controller.

Step S63: acquiring, by the controller, the fluid temperature.

In some embodiments of the present application, the controller may obtain the fluid temperature of the fluid between the heating elements in the heating element group by receiving the fluid temperature of the fluid between the heating elements in the heating element group sent by the single temperature sensor, and then determine the motor speed of the motor corresponding to the heating element group based on the fluid temperature and the obtained element temperature.

In some embodiments of the present application, the initial fluid temperature is collected, converted and calculated by the single temperature sensor, after determining the fluid temperature obtained by converting the initial fluid temperature based on the preset conversion relationship as the fluid temperature of the fluid between the heating elements in the heating element group, the single temperature sensor sends the fluid temperature to the controller for subsequent determination of the motor speed. Although there may be errors in the sensing accuracy of the single temperature sensor, converting the initial fluid temperature through the preset conversion relationship and then using it to determine the motor speed may reduce the material cost and improve the control effect of the fluid velocity.

Figure 7:
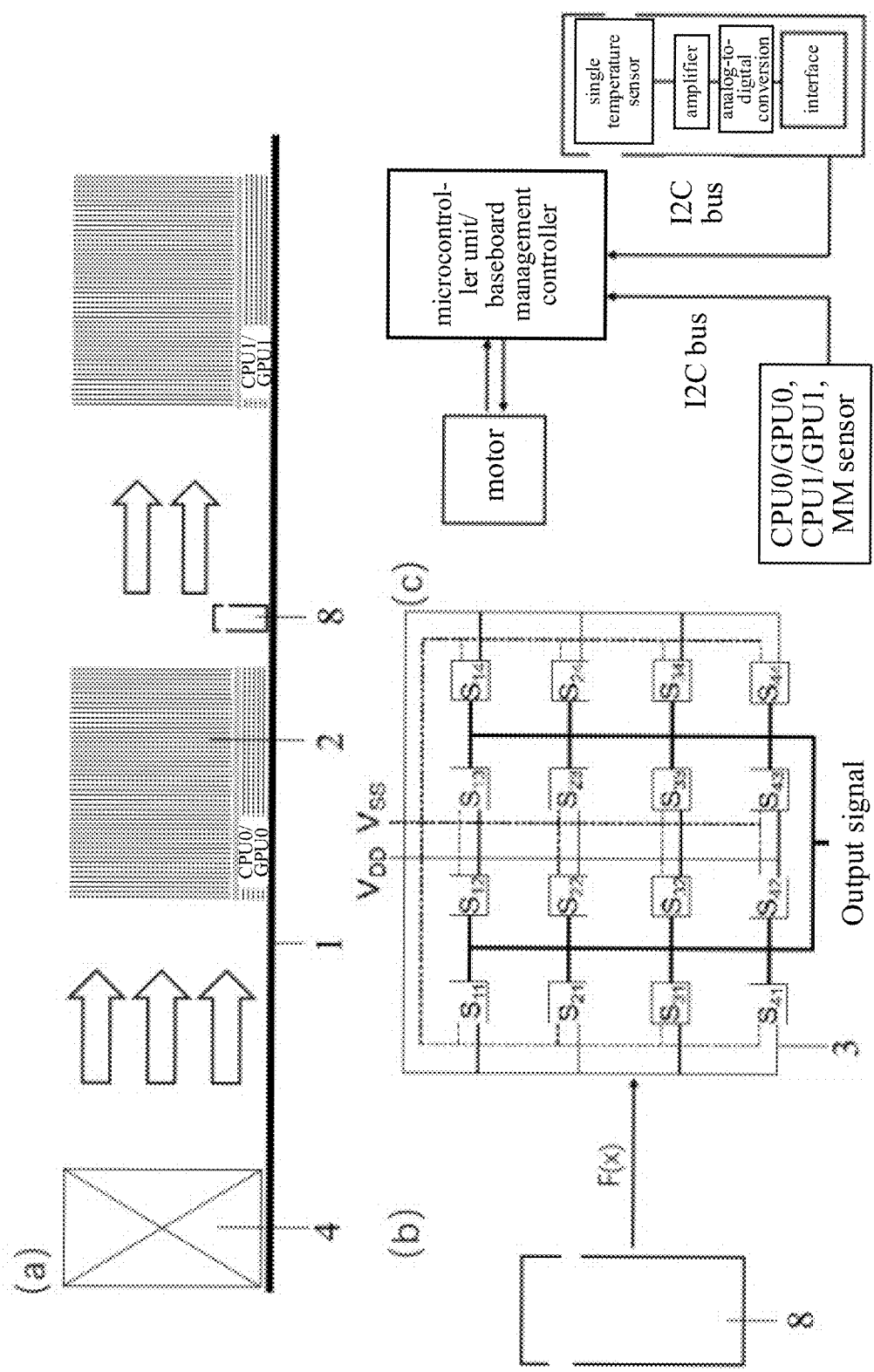
FIG. 7 is a schematic diagram related to a single temperature sensor according to some embodiments of the present application.

As shown in FIG. 7, FIG. 7 is a schematic diagram related to a single temperature sensor according to some embodiments of the present application. Among them, diagram (a) in FIG. 7 is a side view of the position of the single temperature sensor, diagram (b) in FIG. 7 is a schematic diagram of the numerical conversion relationship between the single temperature sensor and the array temperature sensor, and the conversion relationship may be obtained through experiments, and diagram (c) in FIG. 7 is a fluid sensing-control topology diagram for the single temperature sensor. As shown in diagram (a) in FIG. 7, the single temperature sensor 8 is located between the heating element 0 (CPU0/GPU0) and the heating element 1 (CPU1/GPU1/MM), its upper part is the fluid sampling chamber with the fluid inlet and the fluid outlet, and the temperature probes are located in the sampling chamber. The label 4 is the motor, the label 1 is the motherboard, and the label 2 is the heat sink of the heating element. Compared to the array temperature sensors, the single temperature sensor may significantly reduce the material costs, but its sensing accuracy will decrease. Therefore, as shown in diagram (b) in FIG. 7, the output value A (i.e. initial fluid temperature) of the single temperature sensor 8 needs to be converted into a value B with higher accuracy through the conversion relationship F(x) (i.e. preset conversion relationship) with a certain error correction function. This value B is the output value (i.e. average temperature) of the array temperature sensor 3. And the controller (such as microcontroller unit MCU/baseboard management controller BMC) may determine the motor speed of the motor corresponding to the heating element group based on the value B and the element temperature of the heating elements (such as CPU/GPU/MM) (as shown in diagram (c) in FIG. 7).

Combined with any of the above embodiments, some embodiments of the present application also provide a method for controlling the internal temperature of a server. In this method, the system for controlling the internal temperature of the server includes not only the controller and the fluid temperature sensor, but also a fluid baffle. Among them, the fluid temperature sensor of this embodiment may be a single temperature sensor or an array temperature sensor.

In some embodiments of the present application, the fluid baffle is arranged on the side of the fluid temperature sensor. Among them, the fluid baffle is composed of a first baffle arranged vertically and a second baffle located at a first angle to the first baffle on the side of the fluid temperature sensor. That is to say, the fluid baffle is composed of the first baffle and the second baffle, where the first baffle is arranged vertically and the second baffle is located close to the side of the fluid temperature sensor and at the first angle to the first baffle. Among them, the first angle may be a freely set baffle angle based on human experience or project needs, such as 120°, 160°, etc. Some embodiments of the present application do not limit the specific value of the first angle.

Figures 8, 9:
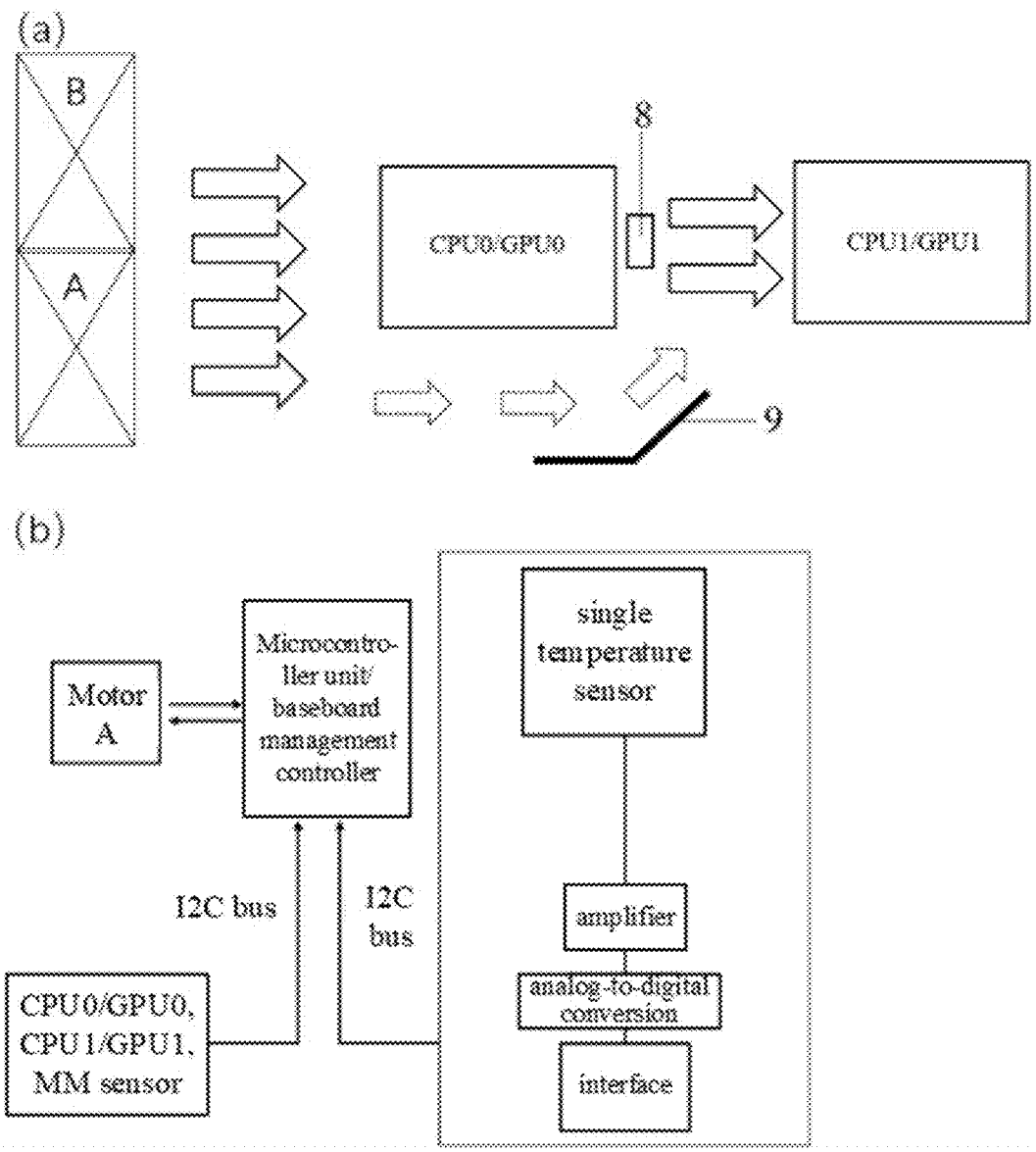
FIG. 8 is a schematic diagram of a sensing-control architecture of a fluid state according to some embodiments of the present application.
FIG. 9 is a structural block diagram of a system for controlling internal temperature of a server according to some embodiments of the present application.

As shown in FIG. 8, it is a schematic diagram of a sensing-control architecture of the fluid states according to some embodiments of the present application. FIG. 8 is a top view, as shown in diagram (a) in FIG. 8, which is a top view of the position of a single temperature sensor and a fluid baffle. The fluid baffle 9 is arranged on the side of the single temperature sensor 8, composed of the first baffle arranged vertically and the second baffle at the first angle to the first baffle on the side of the single temperature sensor 8. In this way, the low-temperature fluid on the side of the heating element may be guided into the position between the heating element 0 (such as CPU0/GPU0) and the heating element 1 (such as CPU1/GPU1/MM) from the side through the fluid baffle 9. As shown by the dashed arrow in diagram (a) in FIG. 8, since this fluid is usually located at the position of the memory module, the temperature is relatively low. Therefore, utilizing this part of the fluid is beneficial for cooling the heating element 1 (such as CPU1/GPU1/MM).

Among them, the arrangement of the fluid baffle 9 on the side of the single temperature sensor 8 in diagram (a) in FIG. 8 is just an example. In fact, the fluid baffle 9 may also be arranged on the other side of the single temperature sensor 8 or on both sides of the single temperature sensor 8. Among them, when the fluid baffle 9 is arranged on the other side of the single temperature sensor 8, the first baffle in the fluid baffle 9 is still placed vertically, and the position of the second baffle when the fluid baffle 9 is arranged on the other side of the single temperature sensor 8 is symmetrical to the position of the second baffle when the fluid baffle 9 is arranged on the side of the single temperature sensor 8. And, arranging the fluid baffle 9 on both sides of the array temperature sensor 3, is the same or similar to the method of arranging the fluid baffle 9 on the side and/or the other side of the single temperature sensor 8. Some embodiments of the present application will not be repeated here.

As shown in diagram (b) in FIG. 8, it may be understood as a schematic diagram of the working process of the sensing-control architecture of the fluid states in FIG. 8. Among them, the controller may be the microcontroller unit MCU/baseboard management controller BMC. The controller obtains the fluid temperature value transmitted by the single temperature sensor through the I2C bus, as well as the element temperature value transmitted by the heating elements (such as CPU0/GPU0, CPU1/GPU1, MM sensors) through the I2C bus, and then cools the heating elements by changing the speed of the motor A.

In some embodiments of the present application, in addition to the above steps, it may also include step S71:

Step S71: guiding, by the first baffle and the second baffle of the fluid baffle, fluid on a side of the heating element group into a space between the heating elements in the heating element group, to change the fluid temperature of the fluid between the heating elements in the heating element group, and to cool the interior of the server.

After the fluid is emitted by the motor, some embodiments of the present application may guide part of the low-temperature fluid (such as the fluid that has not exchanged heat with the heating element and/or the fluid that has exchanged heat with the low-temperature heating element, such as the internal memory) on the side of the heating element group into the space between the heating elements in the heating element group from the side through the first baffle and the second baffle of the fluid baffle. This may change the direction of motion of the fluid on the side of the heating element group, thereby changing the fluid temperature of the fluid between the heating elements in the heating element group by introducing the low-temperature fluid into the fluid between the heating elements, achieving the goal of reducing the fluid temperature of the fluid between the heating elements, cooling the interior of the server, and further optimizing the cooling effect on subsequent heating elements.

In some embodiments of the present application, the direction of motion of the low-temperature fluid on the side of the heating element group may be adjusted through the fluid baffle, and it may be guided into the space between the heating elements in the heating element group, thereby adjusting the fluid temperature of the fluid between the heating elements in the heating element group. Based on controlling the fluid velocity of the fluid between the heating elements, the cooling effect on subsequent heating elements may be further optimized. That is to say, some embodiments of the present application provide a dual function component design for the fluid baffle, realizing its dual functions of temperature modulation and direction modulation of the fluid. In some embodiments of the present application, it may simultaneously control the fluid velocity of the fluid between the heating elements, the direction of motion of the fluid on the side of the heating elements, and the fluid temperature of the fluid between the heating elements, thereby achieving better cooling effect on the interior of the server.

Combined with any of the above embodiments, some embodiments of the present application also provide a method for controlling the internal temperature of a server. In this method, step S14 may include step S81:

Step S81: controlling, by the controller, the motor speed corresponding to each of the plurality of heating element groups, and controlling the fluid velocity of the fluid between the heating elements in each of the plurality of heating element groups, to cool the interior of the server.

In some embodiments of the present application, the server may be any one of a multiprocessor server, a blade server, an air-cooled server, and an immersion liquid-cooled server. Among them, the multiprocessor server may be a 4-processor server, an 8-processor server, etc., and the height of the servers is TU (unit) or more. Thus, the servers of some embodiments of the present application include a plurality of heating element groups, each of the plurality of heating element groups corresponds to a motor responsible for cooling the heating elements of that group. In some embodiments of the present application, for each heating element group in the plurality of heating element groups, the fluid between the heating elements in each heating element group may be controlled through the method for controlling the internal temperature of the server in any of the above embodiments.

In some embodiments of the present application, firstly, the system for controlling the internal temperature of the server may obtain the element temperature of the heating elements of each of the plurality of heating element groups through the controller. Then, the fluid temperature of the fluid between the heating elements in each of the plurality of heating element groups may be obtained through the controller and the fluid temperature sensor. Next, the controller may be used to process the element temperature of the heating elements of each heating element group of the plurality of heating element groups, as well as the fluid temperature of the fluid between the heating elements in each heating element group, to determine the motor speed of the motor corresponding to each heating element group of the plurality of heating element groups. Finally, the controller may be used to control the motor speed of the motor corresponding to each heating element group of the plurality of heating element groups to be a determined and respectively corresponding motor speed, to control the fluid velocity of the fluid between the heating elements in each heating element group. This achieves the fluid state control between the heating elements in each heating element group inside the server, thereby cooling the interior of the server and achieving better cooling effects on the interior of the server.

In some embodiments of the present application, the system for controlling the internal temperature of the server may include one controller, and the data of the plurality of heating element groups are processed and controlled by the same controller. The system for controlling the internal temperature of the server may also include a plurality of controllers, and the number of the plurality of controllers may be the same as or different from the number of the plurality of heating element groups, so that the data of the plurality of heating element groups may be processed and controlled through the controllers with the same or different numbers, and some embodiments of the present application do not limit this in any way.

It may be understood that for each heating element group of the plurality of heating element groups, the fluid temperature sensor, the fluid baffle, etc. corresponding to each heating element group may be disposed to control the fluid between the heating elements in each heating element group, thereby improving the computing performance of the server. Especially for many products such as 4-processor, 8-processor, multiprocessor, fusion architecture (blade server), air-cooled, liquid cooled servers, etc., it has strong universality.

In some embodiments of the present application, inside a multiprocessor server chassis, the temperature of the low-temperature fluid significantly increases after the heat exchange with the heat sink of the front heating element, as well as the velocity decreases, the direction and spatial distribution changes, which is unfavorable for the heating elements that need to be cooled later. Therefore, some embodiments of the present application accurately/reasonably perceive the changes in the state (such as temperature) of the fluid after the heat exchange in the server, and regulate the state (such as temperature, velocity, direction, etc.) of part of the high-temperature fluid to reduce the impact of changes in the fluid state (such as temperature, velocity, direction, etc.) on the cooling of the heating elements, thereby reducing the temperature of the heating elements and improving its working performance, enhancing the cooling effect of the components of the server, and also reducing the PUE (Power Usage Effectiveness) value, which has a more significant effect on servers with high computing power burden. In addition, some embodiments of the present application have strong universality for multiprocessor servers such as 4-processor, 8-processor, blade (blade server), air-cooled, liquid cooled servers, etc., therefore, it is helpful for large-scale applications That is to say, in some embodiments of the present application, the fluid temperature sensor may be arranged at a specific position inside the server to provide real-time sensing of changes in the states of the fluid after the heat exchange with the heating elements. By adopting an internal temperature control solution inside the server, the impact of the fluid state (such as temperature, velocity, direction, etc.) changes on the cooling of subsequent heating elements may be reduced, enhancing the cooling effect of the components of the server. Based on the above two aspects, some embodiments of the present application may provide a series of sensing-control solutions and systems to improve the real-time computing performance of the servers, and have good application prospects in the field of AI servers.

Combined with any of the above embodiments, some embodiments of the present application also provide a method for controlling the internal temperature of a server. In this method, the controller is the microcontroller unit or the baseboard management controller. Among them, the microcontroller unit is "MCU", also known as single-chip microcomputer or microcontroller, while the baseboard management controller is "BMC".

Combined with any of the above embodiments, some embodiments of the present application also provide a method for controlling the internal temperature of a server. In this method, the heating element includes at least one or more of the followings: a central processing unit, a graphics processing unit, and a memory module. Among them, the central processing unit is called "CPU", the graphics processing unit is called "GPU", and the memory module is called: "MM".

It should be noted that for the sake of simplicity, the method embodiments are described as a series of action combinations. However, those skilled in the art should be aware that some embodiments of the present application are not limited by the order of the described actions, as certain steps may be performed in other orders or simultaneously according to some embodiments of the present application. Secondly, those skilled in the art should also be aware that the embodiments described in the specification are all preferred embodiments, and the actions involved are not necessarily necessary for some embodiments of the present application.

Based on the same inventive concept, some embodiments of the present application provide a system for controlling the internal temperature of a server 900, and the system for controlling the internal temperature of the server includes at least: a controller 901 and a fluid temperature sensor 902. Referring to FIG. 9, FIG. 9 is a structural block diagram of the system for controlling internal temperature of the server according to some embodiments of the present application. The fluid temperature sensor 902 is disposed between the heating elements in a heating element group of the server, and the heating element group includes a plurality of heating elements located in a same fluid flow direction; wherein the fluid temperature sensor 902 is configured for collecting fluid temperature of fluid between the heating elements in the heating element group;

the controller 901 is configured for acquiring element temperature of the heating elements in the heating element group;

the controller 901 is configured for acquiring the fluid temperature of the fluid between the heating elements in the heating element group by the fluid temperature sensor;

the controller 901 is configured for determining a motor speed of a motor corresponding to the heating element group according to the element temperature and the fluid temperature; and the controller 901 is configured for controlling the motor speed and controlling a fluid velocity of the fluid between the heating elements in the heating element group, to cool interior of the server.

In some embodiments, the fluid temperature sensor 902 is an array temperature sensor, and the array temperature sensor includes a plurality of temperature probes;

the array temperature sensor is configured for acquiring point temperature of a plurality of points corresponding to the plurality of temperature probes by the plurality of temperature probes, and sending the point temperature to the controller;

the controller 901 is configured for determining total point temperature based on the point temperature of the plurality of points; and the controller 901 is configured for determining the fluid temperature of the fluid between the heating elements in the heating element group based on the total point temperature and a number of the plurality of temperature probes.

In some embodiments, the fluid temperature sensor 902 is an array temperature sensor, and the array temperature sensor includes a plurality of temperature probes;

the array temperature sensor is configured for acquiring point temperature of a plurality of points corresponding to the plurality of temperature probes by the plurality of temperature probes;

the array temperature sensor is configured for determining total point temperature based on the point temperature of the plurality of points;

the array temperature sensor is configured for determining the fluid temperature of the fluid between the heating elements in the heating element group based on the total point temperature and a number of the plurality of temperature probes, and sending the fluid temperature to the controller; and the controller 901 is configured for acquiring the fluid temperature.

In some embodiments, the array temperature sensor further includes: a wire and a frame; each of the plurality of temperature probes includes a fluid inlet and a fluid outlet that are connected to the wire; the frame and the plurality of temperature probes form a planar array structure; the frame includes a microcavity of a first depth in the fluid flow direction; and the array temperature sensor is configured for regulating a direction of motion of the fluid between the heating elements in the heating element group by the fluid inlet, the fluid outlet and the microcavity to cool the interior of the server.

In some embodiments, the fluid temperature sensor 902 is a single temperature sensor;

the single temperature sensor is configured for collecting initial fluid temperature of the fluid between the heating elements in the heating element group, and sending the initial fluid temperature to the controller; and the controller 901 is configured for converting the initial fluid temperature based on a preset conversion relationship, and determining the fluid temperature of the fluid between the heating elements in the heating element group.

In some embodiments, the fluid temperature sensor 902 is a single temperature sensor;

the single temperature sensor is configured for collecting initial fluid temperature of the fluid between the heating elements in the heating element group;

the single temperature sensor is configured for converting the initial fluid temperature based on a preset conversion relationship, determining the fluid temperature of the fluid between the heating elements in the heating element group, and sending the fluid temperature to the controller; and the controller 901 is configured for acquiring the fluid temperature.

In some embodiments, the system for controlling the internal temperature of the server 900 further includes a fluid baffle; the fluid baffle is composed of a first baffle arranged vertically and a second baffle located at a first angle to the first baffle on a side of the fluid temperature sensor, and the fluid baffle is arranged on the side of the fluid temperature sensor; and the fluid baffle is configured for guiding fluid on a side of the heating element group into a space between the heating elements in the heating element group by the first baffle and the second baffle, to change the fluid temperature of the fluid between the heating elements in the heating element group, and to cool the interior of the server.

In some embodiments, the server is any one of a multi-processor server, a blade server, an air-cooled server, and an immersion liquid-cooled server, and the server includes a plurality of heating element groups;

the controller 901 is configured for controlling the motor speed corresponding to each of the plurality of heating element groups, and controlling the fluid velocity of the fluid between the heating elements in each of the plurality of heating element groups, to cool the interior of the server.

In some embodiments, the controller 901 is a microcontroller unit or a baseboard management controller.

In some embodiments, the heating element includes at least one or more of followings: a central processing unit, a graphics processing unit, and a memory module.

Based on the same inventive concept, some other embodiments of the present application provide a server, including: the system for controlling the internal temperature of the server according to any one of the above embodiments of the present application.

Figure 10:
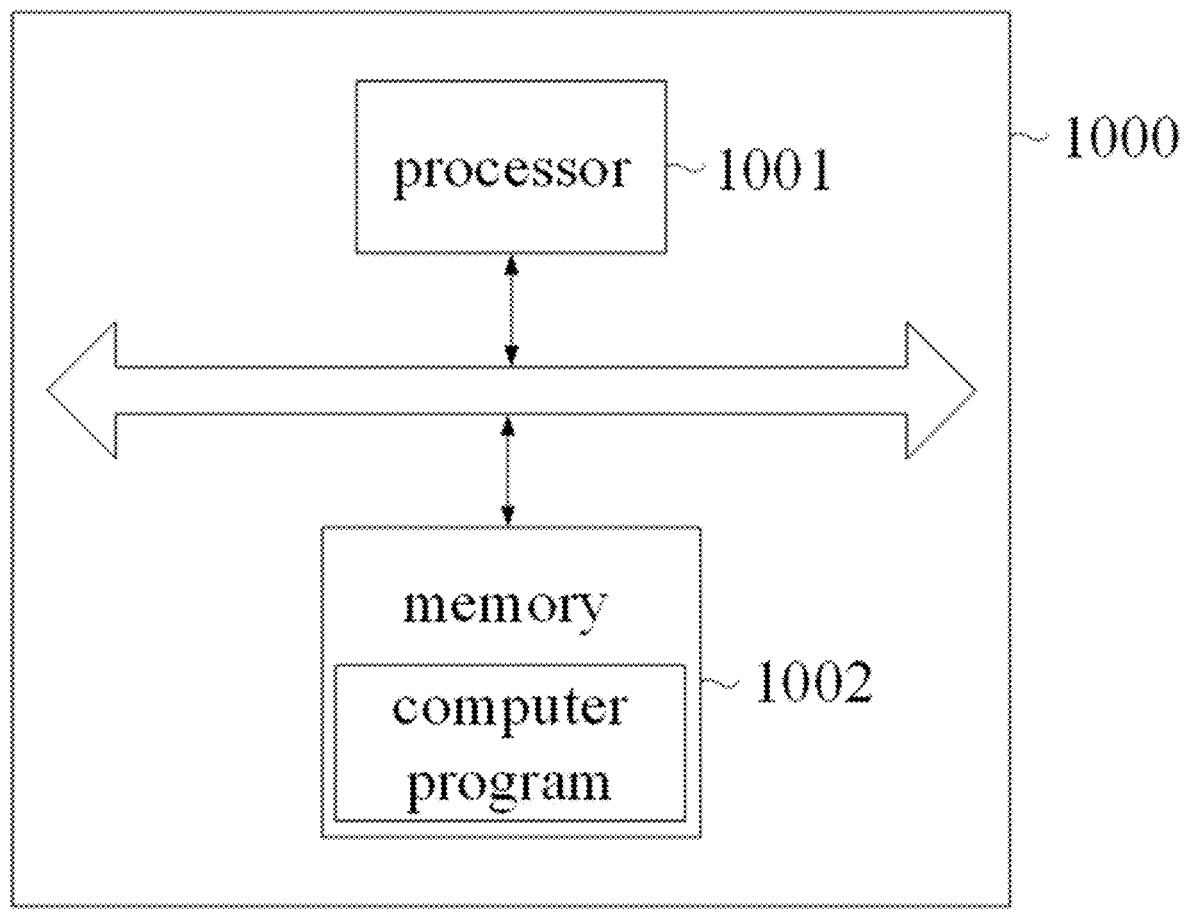
FIG. 10 is a schematic diagram of an electronic device according to some embodiments of the present application.

Based on the same inventive concept, some other embodiments of the present application provide an electronic device 100, as shown in FIG. 10. FIG. 10 is a schematic diagram of an electronic device according to some embodiments of the present application. The electronic device includes a processor 1001, a memory 1002, and a computer program stored on the memory 1002 and running on the processor 1001, wherein the computer program, when executed by the processor, implements operations of the method for controlling the internal temperature of the server according to any one of the above embodiments of the present application.

Based on the same inventive concept, some other embodiments of the present application provide a non-transitory computer-readable storage medium, a computer program is stored on the non-transitory computer-readable storage medium, and the computer program, when executed by a processor, implements operations of the method for controlling the internal temperature of the server according to any one of the above embodiments of the present application.

The various embodiments in this specification are described in a progressive manner, with each embodiment emphasizing its differences from other embodiments. The same and similar parts between the various embodiments may be referred to each other.

It should be noted that in this specification, the terms "including/comprising", "containing" or any other variation thereof are intended to encompass non-exclusive inclusion, such that a process, method, article, or apparatus that includes a series of elements not only includes those elements, but also includes other elements not explicitly listed, or also includes elements inherent to such process, method, article, or apparatus. Without further limitations, the element limited by the statement "including one . . . " does not exclude the existence of other identical elements in the process, method, article, or apparatus that includes that element.

Through the description of the above implementation methods, persons skilled in the art may clearly understand that the above implementation methods may be implemented through the software and necessary general hardware platforms. Certainly, they may also be implemented through the hardware, but in many cases, the former is the better implementation method. Based on this understanding, the technical solution of the present application essentially, or the part that contributes to the related art may be embodied in the form of a software product, which is stored in a non-transitory readable storage medium (such as ROM/RAM, magnetic disk, optical disk) and includes several instructions to enable a terminal (which may be a mobile phone, computer, server, air conditioner, or network device, etc.) to execute the methods of various embodiments of the present application.

The above describes some embodiments of the present application in conjunction with the accompanying drawings, but the present application is not limited to the specific embodiments described above. The specific embodiments described above are only illustrative and not restrictive. Those skilled in the art may also make many forms within the scope of protection of the present application without departing from the purpose and claims of the present application.

Those skilled in the art may realize that the units and algorithm steps described in the embodiments disclosed in the present application may be implemented through electronic hardware, or a combination of computer software and electronic hardware. Whether these functions are executed in the hardware or software depends on the specific application and design constraints of the technical solution. Professional technicians may use different methods to achieve the described functions for each specific application, but such implementation should not be considered beyond the scope of the present application.

Those skilled in the art may clearly understand that, for the sake of convenience and simplicity in description, the specific working processes of the systems, devices, and units described above may refer to the corresponding processes in the aforementioned method embodiments, which will not be repeated here.

In some embodiments provided in the present application, it should be understood that the disclosed system and method may be implemented in other ways. For example, the system embodiments described above are only illustrative. For example, the division of units is only a logical functional division. In practical implementation, there may be other division methods, such as multiple units or components being combined or integrated into another system, or some features being ignored or not executed. On the other hand, the mutual coupling or direct coupling or communication connection displayed or discussed may be indirect coupling or communication connection through some interface, device or unit, which may be electrical, mechanical or other forms.

The units described as separate components may or may not be physically separated, and the components displayed as units may or may not be physical units, i.e. they may be located in one place or distributed across multiple network units. Some or all of the units may be selected according to actual needs to achieve the objectives of some embodiments of the present application.

In addition, the functional units in various embodiments of the present application may be integrated into one processing unit, physically exist separately, or integrate two or more units into one unit.

When the function is implemented in the form of a software functional unit and sold or used as an independent product, it may be stored in a computer non-transitory readable storage medium. Based on this understanding, the technical solution of the present application essentially, or the part that contributes to the related art, or a part of the technical solution, may be embodied in the form of a software product. The computer software product is stored in a non-volatile readable storage medium and includes several instructions to enable a computer device (which may be a personal computer, server, or network device, etc.) to perform all or part of the steps of the various embodiments of the present application. The aforementioned non-transitory readable storage media include: USB flash drives, portable hard drives, ROM (Read Only Memory), RAM (Random Access Memory), magnetic disks or optical disks, and other non-transitory readable storage media that may store program code.

The above are only some specific embodiments of the present application, but the scope of protection of the present application is not limited to this. Any person skilled in the art may easily think of changes or replacements within the technical scope disclosed in the present application, which should be included in the scope of protection of the present application. Therefore, the scope of protection of the present application should be based on the scope of protection of the claims.

The invention claimed is:

1. A method for controlling internal temperature of a server, applied to a system for controlling the internal temperature of the server, wherein the system for controlling the internal temperature of the server comprises at least: a controller and a fluid temperature sensor; the fluid temperature sensor is disposed between heating elements in a heating element group of the server, the heating element group comprises a plurality of heating elements located in a same fluid flow direction, the fluid temperature sensor is configured for collecting fluid temperature of fluid between the heating elements in the heating element group; and the method comprises:
　　acquiring, by the controller, element temperature of the heating elements in the heating element group;
　　acquiring, by the controller and the fluid temperature sensor, the fluid temperature of the fluid between the heating elements in the heating element group;
　　determining, by the controller, a motor speed of a motor corresponding to the heating element group according to the element temperature and the fluid temperature; and
　　controlling, by the controller, the motor speed, and controlling a fluid velocity of the fluid between the heating elements in the heating element group, to cool interior of the server;
　　wherein when the fluid temperature sensor is an array temperature sensor, the method further comprises:
　　regulating, by a fluid inlet, a fluid outlet and a microcavity of the array temperature sensor, a direction of motion of the fluid between the heating elements in the heating element group, to cool the interior of the server;
　　wherein the array temperature sensor comprises at least a plurality of temperature probes and a frame; each of the plurality of temperature probes comprises the fluid inlet and the fluid outlet; the frame comprises the microcavity of a first depth in the fluid flow direction.

2. The method for controlling internal temperature of the server according to claim 1, wherein the fluid temperature sensor is an array temperature sensor;
　　the acquiring, by the controller and the fluid temperature sensor, the fluid temperature of the fluid between the heating elements in the heating element group comprises:
　　acquiring point temperature of a plurality of points corresponding to the plurality of temperature probes by the plurality of temperature probes of the array temperature sensor, and sending the point temperature to the controller by the array temperature sensor;
　　determining, by the controller, total point temperature based on the point temperature of the plurality of points; and
　　determining, by the controller, the fluid temperature of the fluid between the heating elements in the heating element group based on the total point temperature and a number of the plurality of temperature probes.

3. The method for controlling internal temperature of the server according to claim 1, wherein the fluid temperature sensor is an array temperature sensor;

the acquiring, by the controller and the fluid temperature sensor, the fluid temperature of the fluid between the heating elements in the heating element group comprises:

acquiring, by the plurality of temperature probes of the array temperature sensor, point temperature of a plurality of points corresponding to the plurality of temperature probes;

determining, by the array temperature sensor, total point temperature based on the point temperature of the plurality of points;

determining, by the array temperature sensor, the fluid temperature of the fluid between the heating elements in the heating element group based on the total point temperature and a number of the plurality of temperature probes, and sending the fluid temperature to the controller; and acquiring, by the controller, the fluid temperature.

4. The method for controlling internal temperature of the server according to claim 1, wherein the array temperature sensor further comprises: a wire; each of the plurality of temperature probes is connected to the wire; the frame and the plurality of temperature probes form a planar array structure.

5. The method for controlling internal temperature of the server according to claim 1, wherein the fluid temperature sensor is a single temperature sensor;

the acquiring, by the controller and the fluid temperature sensor, the fluid temperature of the fluid between the heating elements in the heating element group comprises:

collecting, by the single temperature sensor, initial fluid temperature of the fluid between the heating elements in the heating element group, and sending the initial fluid temperature to the controller; and converting, by the controller, the initial fluid temperature based on a preset conversion relationship, and determining the fluid temperature of the fluid between the heating elements in the heating element group.

6. The method for controlling internal temperature of the server according to claim 1, wherein the fluid temperature sensor is a single temperature sensor;

the acquiring, by the controller and the fluid temperature sensor, the fluid temperature of the fluid between the heating elements in the heating element group comprises:

collecting, by the single temperature sensor, initial fluid temperature of the fluid between the heating elements in the heating element group; and converting, by the single temperature sensor, the initial fluid temperature based on a preset conversion relationship, determining the fluid temperature of the fluid between the heating elements in the heating element group, and sending the fluid temperature to the controller; and acquiring, by the controller, the fluid temperature.

7. The method for controlling internal temperature of the server according to claim 1, wherein the system for controlling the internal temperature of the server further comprises a fluid baffle; the fluid baffle is composed of a first baffle arranged vertically and a second baffle located at a first angle to the first baffle on a side of the fluid temperature sensor, and the fluid baffle is arranged on the side of the fluid temperature sensor;

the method further comprises:

guiding, by the first baffle and the second baffle of the fluid baffle, fluid on a side of the heating element group into a space between the heating elements in the heating element group, to change the fluid temperature of the fluid between the heating elements in the heating element group, and to cool the interior of the server.

8. The method for controlling internal temperature of the server according to claim 1, wherein the server is any one of a multiprocessor server, a blade server, an air-cooled server, and an immersion liquid-cooled server, and the server comprises a plurality of heating element groups;

controlling, by the controller, the motor speed, and controlling a fluid velocity of the fluid between the heating elements in the heating element group, to cool interior of the server comprises:

controlling, by the controller, the motor speed corresponding to each of the plurality of heating element groups, and controlling the fluid velocity of the fluid between the heating elements in each of the plurality of heating element groups, to cool the interior of the server.

9. An electronic device, comprising: a processor, a memory, and a computer program stored on the memory and running on the processor, wherein the computer program, when executed by the processor, implements operations of the method for controlling the internal temperature of the server according to claim 1.

10. A non-transitory computer-readable storage medium, wherein a computer program is stored on the non-transitory computer-readable storage medium, and the computer program, when executed by a processor, implements operations of the method for controlling the internal temperature of the server according to claim 1.

11. A system for controlling internal temperature of a server, wherein the system for controlling the internal temperature of the server comprises at least: a controller and a fluid temperature sensor; the fluid temperature sensor is disposed between heating elements in a heating element group of the server, and the heating element group comprises a plurality of heating elements located in a same fluid flow direction; wherein the fluid temperature sensor is configured for collecting fluid temperature of fluid between the heating elements in the heating element group;

the controller is configured for acquiring element temperature of the heating elements in the heating element group;

the controller is configured for acquiring the fluid temperature of the fluid between the heating elements in the heating element group by the fluid temperature sensor;

the controller is configured for determining a motor speed of a motor corresponding to the heating element group according to the element temperature and the fluid temperature; and the controller is configured for controlling the motor speed and controlling a fluid velocity of the fluid between the heating elements in the heating element group, to cool interior of the server;

wherein when the fluid temperature sensor is an array temperature sensor, the array temperature sensor is configured for regulating, by a fluid inlet, a fluid outlet and a microcavity of the array temperature sensor, a direction of motion of the fluid between the heating elements in the heating element group, to cool the interior of the server;

wherein the array temperature sensor comprises at least a plurality of temperature probes and a frame; each of the plurality of temperature probes comprises the fluid inlet and the fluid outlet; the frame comprises the microcavity of a first depth in the fluid flow direction.

12. The system for controlling the internal temperature of the server according to claim 11, wherein the fluid temperature sensor is an array temperature sensor;
the array temperature sensor is configured for acquiring point temperature of a plurality of points corresponding to the plurality of temperature probes by the plurality of temperature probes, and sending the point temperature to the controller;
the controller is configured for determining total point temperature based on the point temperature of the plurality of points; and
the controller is configured for determining the fluid temperature of the fluid between the heating elements in the heating element group based on the total point temperature and a number of the plurality of temperature probes.

13. The system for controlling the internal temperature of the server according to claim 11, wherein the fluid temperature sensor is an array temperature sensor;
the array temperature sensor is configured for acquiring point temperature of a plurality of points corresponding to the plurality of temperature probes by the plurality of temperature probes;
the array temperature sensor is configured for determining total point temperature based on the point temperature of the plurality of points;
the array temperature sensor is configured for determining the fluid temperature of the fluid between the heating elements in the heating element group based on the total point temperature and a number of the plurality of temperature probes, and sending the fluid temperature to the controller; and
the controller is configured for acquiring the fluid temperature.

14. The system for controlling the internal temperature of the server according to claim 11, wherein the array temperature sensor further comprises: a wire; each of the plurality of temperature probes is connected to the wire; the frame and the plurality of temperature probes form a planar array structure.

15. The system for controlling the internal temperature of the server according to claim 11, wherein the fluid temperature sensor is a single temperature sensor;
the single temperature sensor is configured for collecting initial fluid temperature of the fluid between the heating elements in the heating element group, and sending the initial fluid temperature to the controller; and
the controller is configured for converting the initial fluid temperature based on a preset conversion relationship, and determining the fluid temperature of the fluid between the heating elements in the heating element group.

16. The system for controlling the internal temperature of the server according to claim 11, wherein the fluid temperature sensor is a single temperature sensor;
the single temperature sensor is configured for collecting initial fluid temperature of the fluid between the heating elements in the heating element group;
the single temperature sensor is configured for converting the initial fluid temperature based on a preset conversion relationship, determining the fluid temperature of the fluid between the heating elements in the heating element group, and sending the fluid temperature to the controller; and
the controller is configured for acquiring the fluid temperature.

17. The system for controlling the internal temperature of the server according to claim 11, wherein the system for controlling the internal temperature of the server further comprises a fluid baffle; the fluid baffle is composed of a first baffle arranged vertically and a second baffle located at a first angle to the first baffle on a side of the fluid temperature sensor, and the fluid baffle is arranged on the side of the fluid temperature sensor; and
the fluid baffle is configured for guiding fluid on a side of the heating element group into a space between the heating elements in the heating element group by the first baffle and the second baffle, to change the fluid temperature of the fluid between the heating elements in the heating element group, and to cool the interior of the server.

18. The system for controlling the internal temperature of the server according to claim 11, wherein the server is any one of a multiprocessor server, a blade server, an air-cooled server, and an immersion liquid-cooled server, and the server comprises a plurality of heating element groups;
the controller is configured for controlling the motor speed corresponding to each of the plurality of heating element groups, and controlling the fluid velocity of the fluid between the heating elements in each of the plurality of heating element groups, to cool the interior of the server.

19. The system for controlling the internal temperature of the server according to claim 11, wherein the heating element comprises at least one or more of followings: a central processing unit, a graphics processing unit, and a memory module.

20. A server, comprising: the system for controlling the internal temperature of the server according to claim 11.

* * * * *